(12) United States Patent
Valentine et al.

(10) Patent No.: US 12,516,243 B2
(45) Date of Patent: Jan. 6, 2026

(54) LIQUID CRYSTAL FORMULATION FOR PIXELATED LOCAL DIMMING

(71) Applicant: Meta Platforms Technologies, LLC, Menlo Park, CA (US)

(72) Inventors: Gareth John Valentine, Kirkland, WA (US); Wetthasinhage Sameera Kelum Perera, Kent, OH (US); Md Mostafa, Redmond, WA (US); Xi Wu, Redmond, WA (US); Paige Gottschalk, Woodinville, WA (US); Rahul Agarwal, Woodinville, WA (US); Kai-Han Chang, Jr., Troy, MI (US); Nicholas John Diorio, Jr., Duvall, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/809,978

(22) Filed: Aug. 20, 2024

(65) Prior Publication Data

US 2025/0179363 A1    Jun. 5, 2025

Related U.S. Application Data

(60) Provisional application No. 63/606,269, filed on Dec. 5, 2023.

(51) Int. Cl.
| | | |
|---|---|---|
| G02F 1/1333 | (2006.01) | |
| C09K 19/02 | (2006.01) | |
| C09K 19/52 | (2006.01) | |
| C09K 19/58 | (2006.01) | |
| G02F 1/1334 | (2006.01) | |
| G02F 1/135 | (2006.01) | |
| G02F 1/137 | (2006.01) | |
| G06F 3/01 | (2006.01) | |
| G06T 19/00 | (2011.01) | |
| C09K 19/54 | (2006.01) | |

(52) U.S. Cl.
CPC ........ *C09K 19/025* (2013.01); *C09K 19/0225* (2013.01); *C09K 19/52* (2013.01); *C09K 19/586* (2013.01); *G02F 1/13345* (2021.01); *G02F 1/135* (2013.01); *G02F 1/13706* (2021.01); *G02F 1/13775* (2021.01); *G06F 3/011* (2013.01); *G06T 19/006* (2013.01); *C09K 2019/548* (2013.01)

(58) Field of Classification Search
CPC ...... C09K 19/02; C09K 19/52; C09K 19/586; C09K 19/38; G02F 1/1333
See application file for complete search history.

(56) References Cited

U.S. PATENT DOCUMENTS

| | | | |
|---|---|---|---|
| 10,920,145 B2* | 2/2021 | Archambeau | C09K 19/588 |
| 2023/0174864 A1* | 6/2023 | Jákli | G02F 1/0027 |
| | | | 252/299.01 |

FOREIGN PATENT DOCUMENTS

WO    WO-2021116843 A1 *  6/2021  ........... C09K 19/586

* cited by examiner

*Primary Examiner* — Geraldina Visconti
(74) *Attorney, Agent, or Firm* — Greenberg Traurig, LLP

(57) ABSTRACT

A polymer-stabilized liquid crystal (PSLC) composition includes a liquid crystal component having high dielectric constant, a chiral dopant, a stabilizing polymer, and a photo-initiator. Through the application of an applied voltage, the polymer-stabilized liquid crystal composition may be implemented to induce pixelated dimming in an AR display.

20 Claims, 14 Drawing Sheets

Pixelated Dimming

Full-Lens Dimming

LCs for High Voltage Holding Ratio (VHR)

| Structure | $T_m$ [°C] | $T_c$ [°C] | $\Delta\varepsilon$ | $\Delta n$ | $\eta$ [mm²/s] | VHR [%] |
|---|---|---|---|---|---|---|
|  | 9.0 | 33.2 | 8.9 | 0.139 | 13.16 | 99% |
|  | 72.9 | 189.0 | 17.6 | 0.241 | 32.89 | 98% |
|  | 81.5 | 237.4 | 19.7 | 0.254 | 27.90 | 99% |

LIQUID CRYSTAL FORMULATION FOR PIXELATED LOCAL DIMMING

CROSS-REFERENCE TO RELATED APPLICATION

This application claims the benefit of priority under 35 U.S.C. § 119(e) of U.S. Provisional Application No. 63/606,269, filed Dec. 5, 2023, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
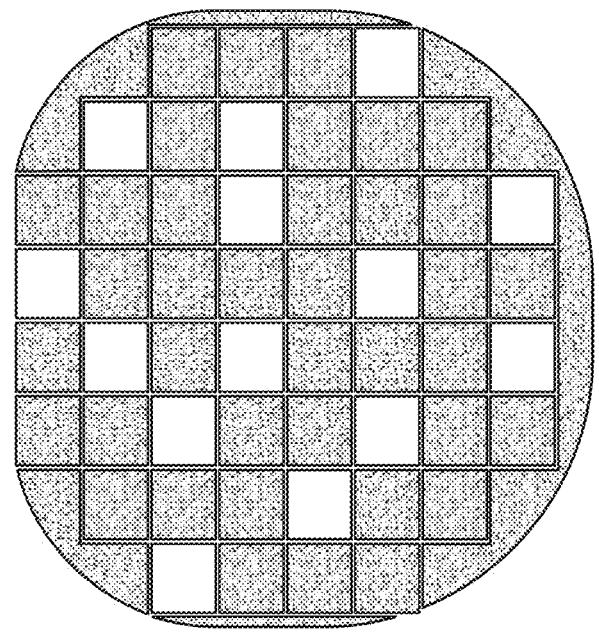
FIG. 1 is a schematic view illustrating pixelated dimming according to some embodiments.
Figure 1:
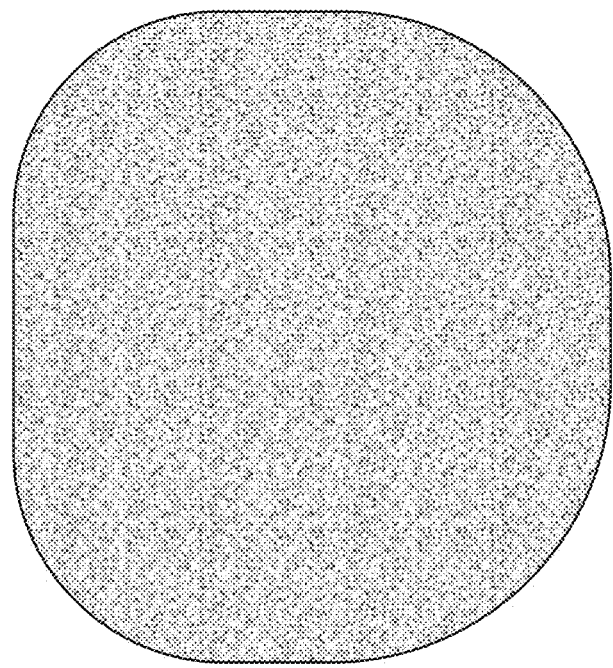

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Virtual reality (VR) and augmented reality (AR) eyewear devices and headsets enable users to experience events, such as interactions with people in a computer-generated simulation of a three-dimensional world or viewing data superimposed on a real-world view. Superimposing information onto a field of view may be achieved through an optical head-mounted display (OHMD) or by using embedded wireless glasses with a transparent heads-up display (HUD) or augmented reality overlay. VR/AR eyewear devices and headsets may be used for a variety of purposes. Governments may use such devices for military training, medical professionals may use such devices to simulate surgery, and engineers may use such devices as design visualization aids.

Virtual reality and augmented reality devices and headsets typically include an optical system having a microdisplay and imaging optics. Display light may be generated and projected to the eyes of a user using a display system where the light is in-coupled into a waveguide, transported therethrough by total internal reflection (TIR), replicated to form an expanded field of view, and out-coupled when reaching the position of a viewer's eye.

The microdisplay may be configured to provide an image to be viewed either directly or indirectly using, for example, a micro-OLED display or by illuminating a liquid-crystal based display such as a liquid crystal on silicon (LCoS) microdisplay. Liquid crystal on silicon is a miniaturized reflective or transmissive active-matrix display having a liquid crystal layer disposed over a silicon backplane. During operation, light from a light source is directed at the liquid crystal layer and as the local orientation of the liquid crystals is modulated by a pixel-specific applied voltage, the phase retardation of the incident wavefront can be controlled to generate an image from the reflected or transmitted light. In some instantiations, a liquid crystal on silicon display may be referred to as a spatial light modulator.

LCoS-based projectors typically use three LCoS chips, one each to modulate light in the red, green, and blue channels. An LCoS projector may be configured to deliver the red, green, and blue components of image light simultaneously, which may result in a projected image having rich and well-saturated colors. As will be appreciated, an LCoS display may be configured for wavelength selective switching, structured illumination, optical pulse shaping, in addition to near-eye displays.

Due at least in part to inherent high resolution and high fill factors (minimal inter-pixel spacing), visible pixelation on an LCOS machine may be essentially nonexistent resulting in a high fidelity, continuous image. Moreover, in contrast to micro-mirror based projection systems that can generate high frequencies that accentuate their digital nature, LCoS pixel edges tend to be smoother, which may give them an analog-like response resulting in a more natural image.

In certain applications, the lenses of an AR device may be dimmed to render AR content against bright environmental backgrounds. Dimming techniques may also be effective at preserving display projector power and lifetime. Simply attenuating the entire environmental scene, however, is inadequate in many scenarios. Because the real world remains visible through the dimmed region, the virtual content must be of sufficient brightness to overcome the spatial content of the real world, especially if there are conflicting depth cues within the virtual content.

In view of the foregoing, and in accordance with some embodiments, localized dimming in AR glasses may be achieved by dividing a dimming element into smaller individually-addressable sections or "pixels." In contrast to global dimming, localized dimming may beneficially impact inclusive rendering, social acceptability, etc. With local dimming, selected regions of the display are dimmed to the exclusion of non-selected regions.

A variation of localized dimming includes the introduction of optical scattering to a real world scene. With optical scattering, real world content behind virtual content may be effectively erased. A switchable scattering material may be used to achieve this effect. However, many such candidate materials, such as polymer-stabilized cholesteric texture (PSCT) and polymer-dispersed liquid crystals (PDLCs), have unacceptably high background haze levels and require high switching voltages (>10 V).

Notwithstanding recent developments, there remains a need for localized dimming solutions for AR devices and headsets. In accordance with various embodiments, disclosed is a polymer-stabilized liquid crystal composition (PSLC) that is beneficially operable at low activation voltages and possesses a low scattering clear state in the OFF (unpowered) state.

In accordance with particular embodiments, a polymer-stabilized liquid crystal (PSLC) composition may include (i) a liquid crystal component having high dielectric constant, (ii) a chiral dopant, (iii) a stabilizing polymer, and (iv) a photo-initiator. In particular embodiments, the PSLC may exhibit enhanced sensitivity to small electric fields.

As used herein, a polymer-stabilized liquid crystal (PSLC) may refer to a multi-functional material having a polymer network dispersed throughout a continuous phase of liquid crystals. The polymer network may provide anchoring energy to align the liquid crystal molecules. In a polymer-dispersed liquid crystal, liquid crystals may be dissolved or dispersed into a liquid polymer followed by solidification or curing of the polymer. During the transformation of the polymer from a liquid phase to a solid phase, the liquid crystals may separate from the solid polymer and form second phase particles (e.g., droplets) that may be dispersed throughout the solid polymer matrix.

The liquid crystal component may include a nematic liquid crystal (LC) material having a high dielectric constant and/or or a mixture of a normally nematic LC with a small percentage of a material that possesses a ferroelectric nematic phase close to room temperature (~23° C.). A mixture of liquid crystals may be stable in a nematic phase despite the presence of a ferroelectric nematic element.

As used herein, a "ferroelectric material" may include a ferroelectric nematic phase. A ferroelectric nematic phase may be present in a ferroelectric material under certain conditions, i.e., at a particular temperature or over a certain temperature range, for example. That is, a ferroelectric material that is incorporated into a liquid crystal formulation will include a ferroelectric phase at some temperature. In contrast, a "non-ferroelectric material," when incorporated into a liquid crystal formulation, does not exhibit a ferroelectric nematic phase under any conditions, i.e., does not exhibit a ferroelectric nematic phase at any temperature.

In some embodiments, a "high dielectric constant" liquid crystal may have a dielectric constant of at least approximately 30, e.g., 30, 40, 50, 60, 70, 80, 90, or 100, including ranges between any of the foregoing values. For instance, parallel ($\varepsilon_{\parallel}$) and perpendicular ($\varepsilon_{\perp}$) components of the dielectric constant for a high dielectric constant liquid crystal material may range from 60 to 70 and from 10 to 20, respectively. The dielectric constant may be evaluated at a frequency of 1, 5, 10, 20, 50, or 100 kHz, for example. In further embodiments, a liquid crystal material may be characterized by a dielectric constant anisotropy ($\Delta\varepsilon=\varepsilon_{\parallel}-\varepsilon_{\perp}$) of at least approximately 10, e.g., 10, 20, 30, 40, 50, or greater, including ranges between any of the foregoing values.

In some embodiments, a liquid crystal material may have an extraordinary refractive index ($n_e$) of from approximately 1.62 to approximately 1.72, e.g., 1.62, 1.64, 1.66, 1.68, 1.70, or 1.72, including ranges between any of the foregoing values, an ordinary refractive index ($n_o$) of from approximately 1.48 to approximately 1.52, e.g., 1.48, 1.49, 1.50, 1.51, or 1.52, including ranges between any of the foregoing values, and a birefringence ($\Delta n = n_e - n_o$) of at least approximately 0.2.

Example FNLC materials include FNLC919 (Merck KGaA), which has two nematic phases N and $N_1$ above the ferroelectric nematic ($N_F$) phase with the phase sequence on cooling as I 80° C. $N_1$ 44° C. N 32° C. $N_F$ 8° C. Cr, and DIO (2,3',4',5'-tetrafluoro[1,1'-biphenyl]-4-yl-2,6-difluoro-4-(5-propyl-1,3-dioxan-2-yl) benzoate), which includes a 1,3-dioxane unit in the mesogenic core. The lower temperature phase of DIO has been shown to exhibit ferroelectric order.

A chiral dopant may be characterized by a helical twisting power and may be adapted to structure the liquid crystal material for operation with different polarizations of light. With the addition of a chiral dopant, the polymer-stabilized liquid crystal (PSLC) composition may be polarization independent and characterized as cholesteric. Example chiral dopants include (S)-4-cyano-4'-(2-methylbutyl)biphenyl (CB15), S-(+)-2-octyl 4-(4-hexyloxybenzoyloxy)benzoate (S811), R1011, R5011, and other LC reactive mesogens configured to create helical structures in a host nematic liquid crystal composition.

The stabilizing polymer may include one or more components that polymerize upon activation. The stabilizing polymer may be thermally or chemically activated. The stabilizing polymer may include a mono-functional polymer component and/or a bifunctional polymer component. Example materials include 2-methyl-1,4-phenylene bis(4-(3-(acryloyloxy)propoxy)benzoate) (RM257) and 2-methyl-1,4-phenylene bis(4-((6-(acryloyloxy)hexyl)oxy)benzoate (R6M RM82), which are diacrylate mesogens, as well as HCM20 and HCM21.

The photo-initiator may be configured to catalyze the polymerization of the stabilizing polymer in response to exposure to UV radiation. Photo-initiators may be characterized as Type I or Type II. Type I photo-initiators cleave when excited by UV light resulting in a free-radical. Thus, Type I photo-initiators sustain a uni-molecular bond cleavage after absorption of light to render the reactive species. On the other hand, Type II photo-initiators when excited abstract a hydrogen or electron from a donor. The extra electron produces a free-radical that initiates the reaction. Type II photo-initiators sustain a bi-molecular reaction.

Suitable photo-initiators may be characterized as benzyl ketals, α,α-dialkoxyacetophenones, or α-hydroxyalkylphenones that contain chromophoric groups that absorb radiation in the ultraviolet or visible range and undergo photolysis with formation of free radicals. Example photo-initiators include 2-hydroxy-4'-(2-hydroxyethoxy)-2-methylpropiophenone (Irgacure® 184), 2-benzyl-2-dimethylamino-1-(4-morpholinophenyl)-butanone-1 (Irgacure® 369), and 2,2-dimethoxy-1,2-diphenylethanone (DMPA) (Irgacure® 651).

The disclosed polymer-stabilized liquid crystal compositions are naturally clear in the OFF state when placed in a liquid crystal cell with suitable alignment layers, but become highly scattering when activated with an AC field of 5 V rms, for example. In particular embodiments, an LC cell containing a polymer-stabilized liquid crystal composition may be driven between clear and dimming states using an applied voltage of less than approximately 5 V, e.g., 1, 2, 3, 4, or 5 V, including ranges between any of the foregoing values.

Exemplary polymer-stabilized liquid crystal compositions that include a liquid crystal (LC) and/or ferronematic liquid crystal (FNLC) component, chiral dopant, stabilizing polymer, and photo-initiator are summarized in Table 1.

TABLE 1

Polymer-Stabilized Liquid Crystal Compositions

|  | LC/FNLC | Chiral dopant | Stabilizing polymer | Photo-initiator |
| --- | --- | --- | --- | --- |
| PSLC | 93-95% | 0.1-2% | 2.5-5% | 0.5-1% |
| Example 1 | 85%/10% | 1% | 3% | 1% |
| Example 2 | 94.3% | 0.3% | 4.4% | 1% |

In certain embodiments, the extent of residual haze in a polymer-stabilized liquid crystal composition in its clear state may be decreased by matching the refractive index of the liquid crystal component to the refractive index of the polymerized network. By way of example, the refractive index mismatch may be less than approximately 10%, e.g., 0.1, 0.5, 1, 2, 4, 6, 8, or 10%, including ranges between any of the foregoing values. The polymerized network may be characterized by bulk haze of less than approximately 5%, e.g., 0.1, 0.2, 0.5, 1, 2, or 5% bulk haze.

As used herein, the terms "haze" and "clarity" may refer to an optical phenomenon associated with the transmission of light through a material, and may be attributed, for example, to the refraction of light within the material, e.g., due to secondary phases or porosity and/or to the reflection of light from one or more surfaces of the material. As will be appreciated, haze may be associated with an amount of light that is subject to wide angle scattering (i.e., at an angle greater than 2.5° from normal) and a corresponding loss of transmissive contrast, whereas clarity may relate to an amount of light that is subject to narrow angle scattering (i.e., at an angle less than 2.5° from normal) and an attendant loss of optical sharpness or "see through quality."

The following will provide, with reference to FIGS. 1-14, detailed descriptions of compositions and related methods associated with liquid crystal formulations for scattering-induced local dimming, i.e., localized scattering. The discussion associated with FIG. 1 includes a description of pixelated dimming. The discussion associated with FIG. 2 includes a description of a liquid crystal element (cell). The discussion associated with FIG. 3 includes a description of example liquid crystal molecules. The discussion associated with FIGS. 4 and 5 includes a description of the optical properties of example liquid crystal elements for different applied voltages. The discussion associated with FIGS. 6-14 relates to exemplary virtual reality and augmented reality devices that may include one or more liquid crystal formulations as disclosed herein.

Referring to FIG. 1, shown is a schematic view illustrating full lens dimming and pixelated dimming according to some embodiments.

Figure 2:
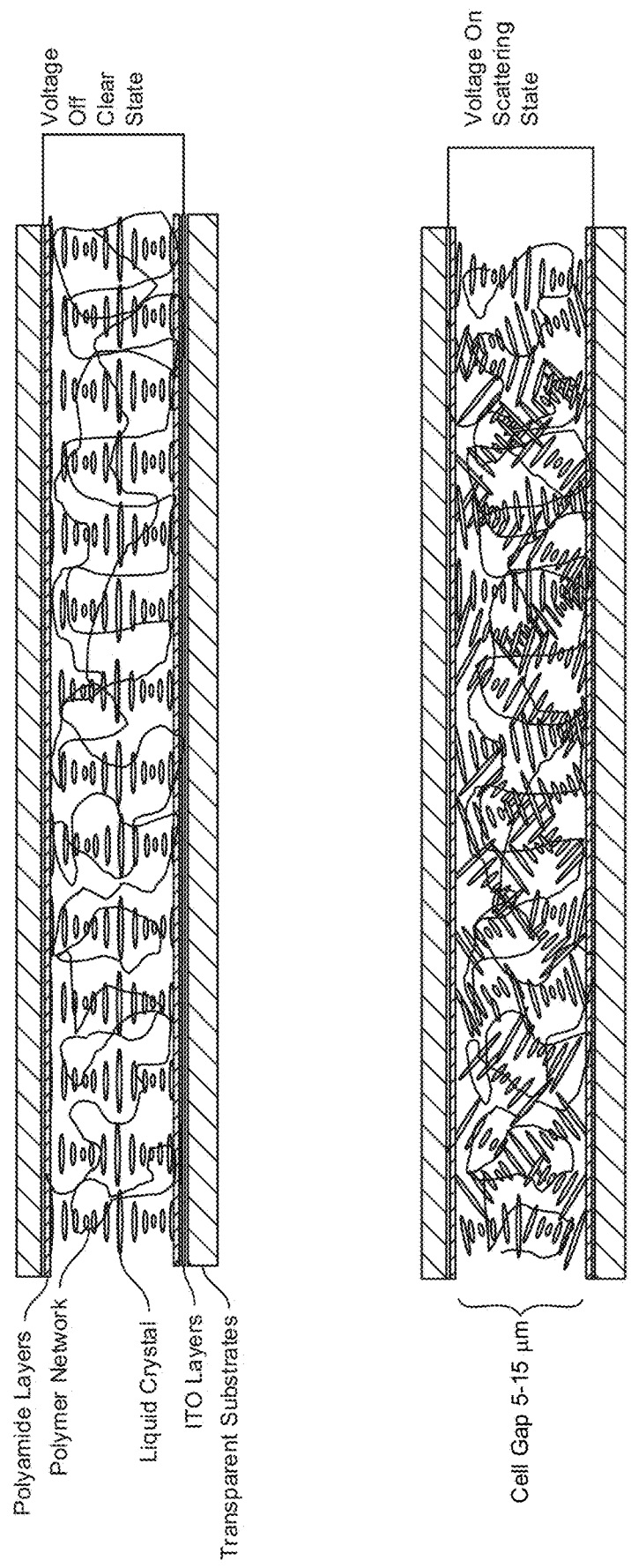
FIG. 2 is a cross-sectional illustration of a liquid crystal display according to some embodiments.

Cross-sectional views of a liquid crystal element including a polymer-stabilized liquid crystal composition are shown in FIG. 2 in both OFF and ON states. In the illustrated examples, the liquid crystal elements include a pair of electroded substrates and a network of liquid crystal molecules dispersed throughout a polymer matrix disposed between the substrates.

Figure 3:
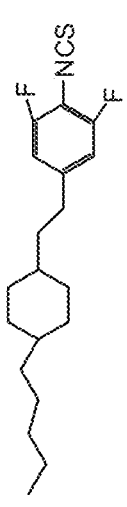
FIG. 3 shows example liquid crystal molecules according to certain embodiments.
Figure 3:
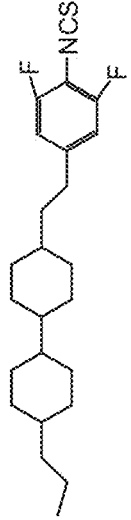
Figure 3:
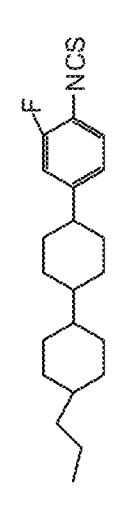

Example liquid crystal materials and representative properties are tabulated in FIG. 3.

Figure 4:
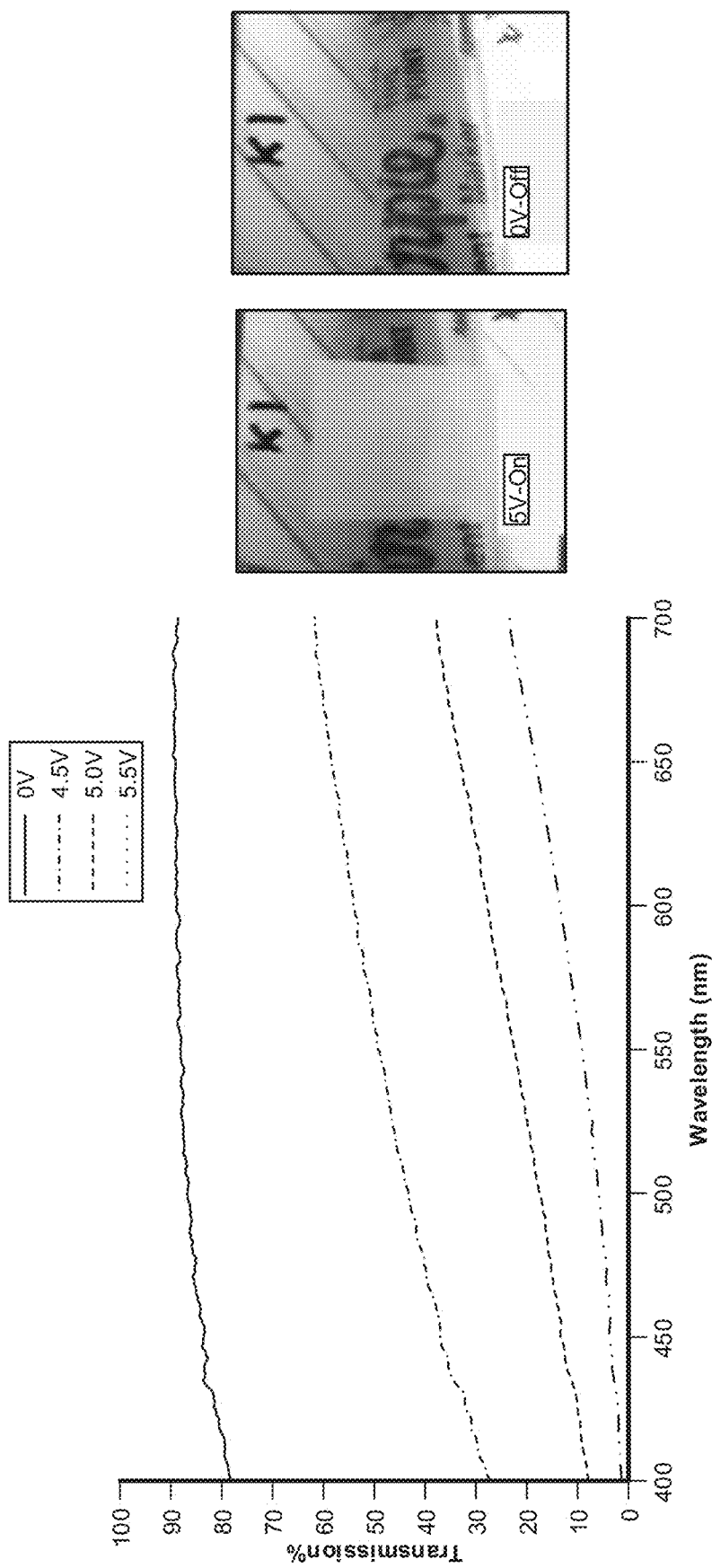
FIG. 4 is a plot of transmission versus wavelength for an exemplary polymer-stabilized liquid crystal composition for different applied voltages according to various embodiments.

Referring to FIG. 4, shown is a plot of transmission versus wavelength for a collimated beam interacting with a LC element including a polymer-stabilized liquid crystal composition at different rms drive voltages. A comparison of the extent of scattering in ON and OFF states is shown in a pair of optical images at 5 V and 0 V, respectively.

Figure 5:
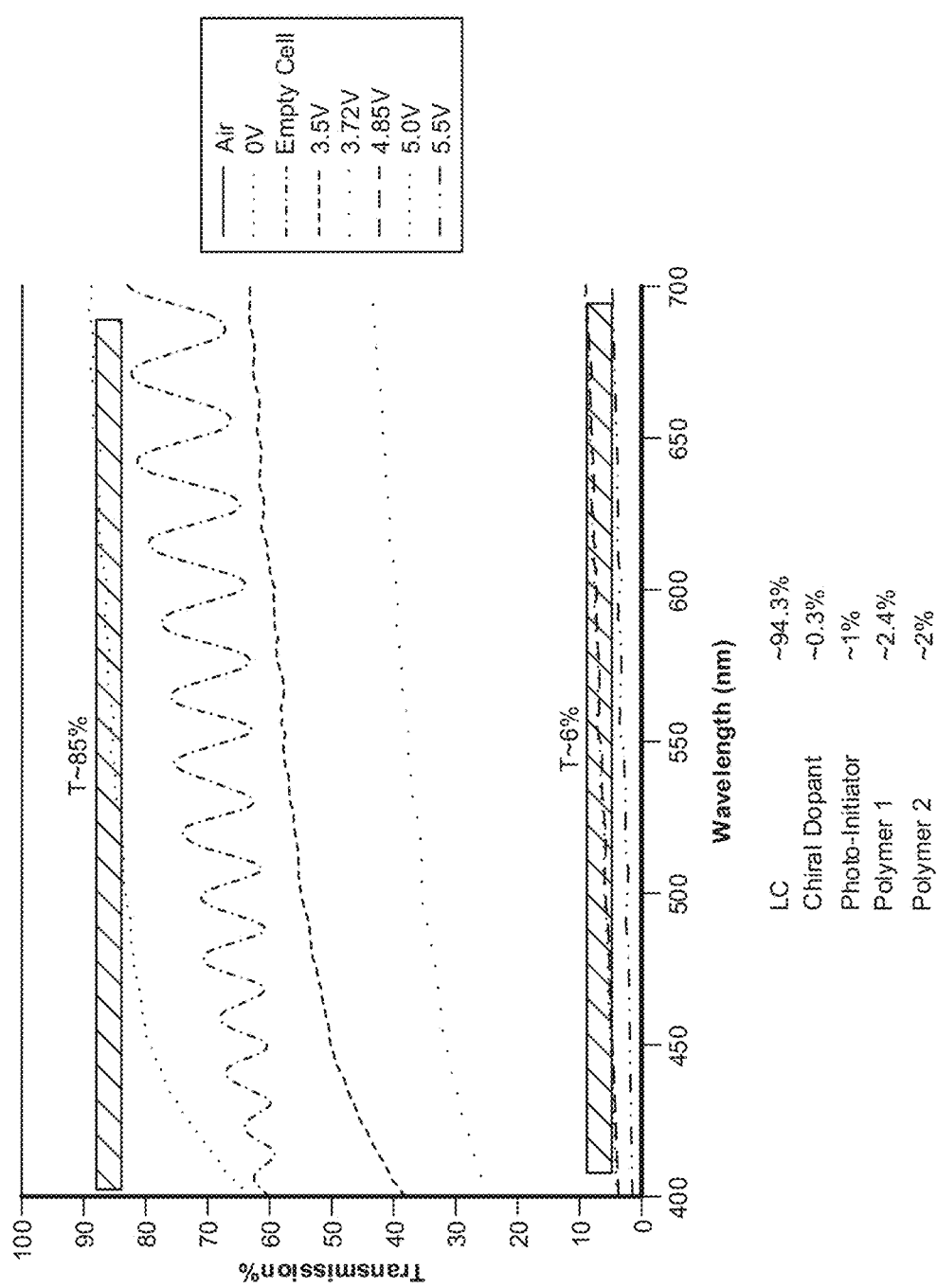
FIG. 5 is a plot of transmission versus wavelength for a further exemplary polymer-stabilized liquid crystal composition for different applied voltages according to various embodiments.

Referring to FIG. 5, by combining a single ended (mono-functional) polymerizing molecule (polymer 1) with a polymer having a double-ended (bi-functional) polymerization construction (polymer 2), the applied electric field needed to obtain commercially-relevant scattering can be decreased.

Example Embodiments

Example 1: A liquid crystal formulation includes a liquid crystal component, a chiral dopant, a stabilizing polymer, and a photo-initiator.

Example 2: The liquid crystal formulation of Example 1, where the liquid crystal formulation includes a polymer-stabilized liquid crystal (PSLC), a polymer network liquid crystal (PNLC), or a polymer dispersed liquid crystal (PDLC).

Example 3: The liquid crystal formulation of any of Examples 1 and 2, where the liquid crystal component includes a non-ferroelectric material and a ferroelectric material.

Example 4: The liquid crystal formulation of any of Examples 1-3, where the liquid crystal component includes up to approximately 10 wt. % of a ferroelectric material.

Example 5: The liquid crystal formulation of any of Examples 1-4, where a dielectric constant of the liquid crystal component is at least approximately 30 at 1 kHz.

Example 6: The liquid crystal formulation of any of Examples 1-5, where a dielectric constant anisotropy ($\Delta\varepsilon$) of the liquid crystal component is at least approximately 10.

Example 7: The liquid crystal formulation of any of Examples 1-6, where a birefringence ($\Delta n$) of the liquid crystal component is at least approximately 0.2.

Example 8: The liquid crystal formulation of any of Examples 1-7, where the stabilizing polymer includes a diacrylate mesogen.

Example 9: The liquid crystal formulation of any of Examples 1-8, where the stabilizing polymer includes a mono-functional polymer component and a bifunctional polymer component.

Example 10: The liquid crystal formulation of any of Examples 1-9, where a refractive index of the liquid crystal component and a refractive index of the stabilizing polymer differ by less than approximately 10%.

Example 11: The liquid crystal formulation of any of Examples 1-10, where the photo-initiator includes a Type I photo-initiator.

Example 12: The liquid crystal formulation of any of Examples 1-11, including, by weight, at least 85% of the liquid crystal component, 0.1 to 2% of the chiral dopant, 2 to 10% of the stabilizing polymer, and 0.1 to 2% of the photo-initiator.

Example 13: The liquid crystal formulation of any of Examples 1-12, including, by weight, 90 to 95% of the liquid crystal component, 0.1 to 2% of the chiral dopant, 2 to 7% of the stabilizing polymer, and 0.1 to 2% of the photo-initiator.

Example 14: The liquid crystal formulation of Example 13, where the liquid crystal component includes approximately 90 to 99 wt. % of a non-ferroelectric material and approximately 1 to 10 wt. % of a ferroelectric material.

Example 15: A liquid crystal formulation includes a liquid crystal component, a chiral dopant, a stabilizing polymer, and a photo-initiator, where the liquid crystal component has a dielectric constant of at least approximately 30 at 1 kHz, a dielectric anisotropy ($\Delta\varepsilon$) of at least approximately 10, and a birefringence ($\Delta n$) of at least approximately 0.2.

Example 16: The liquid crystal formulation of Example 15, where any of Examples 1-3, where the liquid crystal component includes up to approximately 10 wt. % of a ferroelectric material.

Example 17: The liquid crystal formulation of any of Examples 15 and 16, where a refractive index of the liquid crystal component and a refractive index of the stabilizing polymer differ by less than approximately 10%.

Example 18: A method includes forming a primary electrode, forming a layer of a liquid crystal formulation over the primary electrode, and forming a secondary electrode over the layer of the liquid crystal formulation, where the liquid crystal formulation includes a liquid crystal component, a chiral dopant, a stabilizing polymer, and a photo-initiator.

Example 19: The method of Example 18, including applying a first voltage of less than approximately 1 V between the primary electrode and the secondary electrode and across a first region of the layer of the liquid crystal formulation, and applying a second voltage of greater than approximately 4 V between the primary electrode and the secondary electrode and across a second region of the layer of the liquid crystal formulation, where a transmittance of visible light through the first region of the layer of the liquid crystal formulation is greater than approximately 85%, and a transmittance of visible light through the second region of the layer of the liquid crystal formulation is less than approximately 10%.

Example 20: The method of Example 19, where the first region of the layer of the liquid crystal formulation has less than approximately 5% bulk haze.

Embodiments of the present disclosure may include or be implemented in conjunction with various types of Artificial-Reality (AR) systems. AR may be any superimposed functionality and/or sensory-detectable content presented by an artificial-reality system within a user's physical surroundings. In other words, AR is a form of reality that has been adjusted in some manner before presentation to a user. AR can include and/or represent virtual reality (VR), augmented reality, mixed AR (MAR), or some combination and/or variation of these types of realities. Similarly, AR environments may include VR environments (including non-immersive, semi-immersive, and fully immersive VR environments), augmented-reality environments (including marker-based augmented-reality environments, markerless augmented-reality environments, location-based augmented-reality environments, and projection-based augmented-reality environments), hybrid-reality environments, and/or any other type or form of mixed- or alternative-reality environments.

AR content may include completely computer-generated content or computer-generated content combined with captured (e.g., real-world) content. Such AR content may include video, audio, haptic feedback, or some combination thereof, any of which may be presented in a single channel or in multiple channels (such as stereo video that produces a three-dimensional (3D) effect to the viewer). Additionally, in some embodiments, AR may also be associated with applications, products, accessories, services, or some combination thereof, that are used to, for example, create content in an artificial reality and/or are otherwise used in (e.g., to perform activities in) an artificial reality.

AR systems may be implemented in a variety of different form factors and configurations. Some AR systems may be designed to work without near-eye displays (NEDs). Other AR systems may include a NED that also provides visibility into the real world (such as, e.g., VR system 1300 in FIGS. 13A and 13B). While some AR devices may be self-contained systems, other AR devices may communicate and/or coordinate with external devices to provide an AR experience to a user. Examples of such external devices include handheld controllers, mobile devices, desktop computers, devices worn by a user, devices worn by one or more other users, and/or any other suitable external system.

Figure 6:
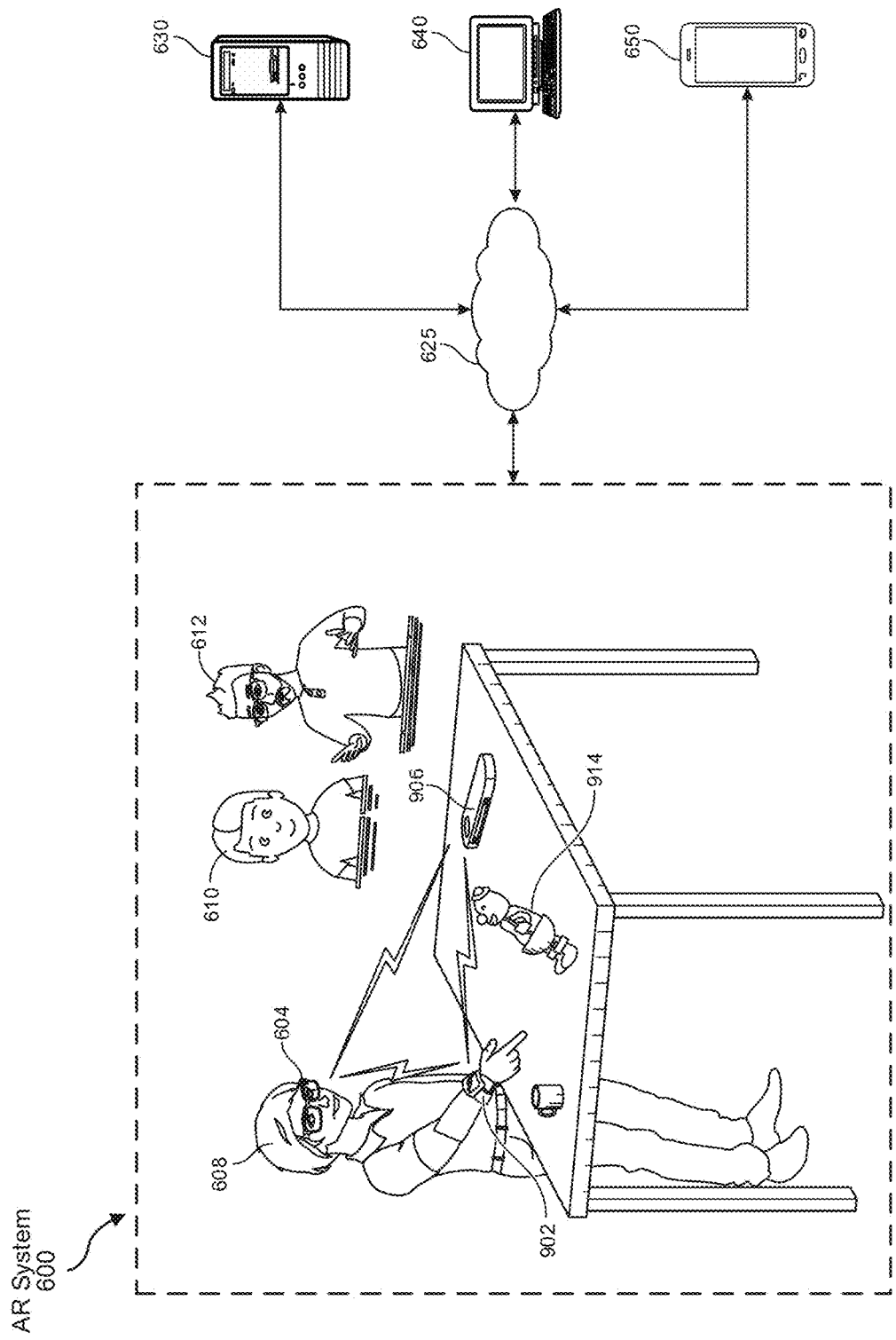
FIG. 6 is an illustration of an example artificial-reality system according to some embodiments of this disclosure.
Figure 7:
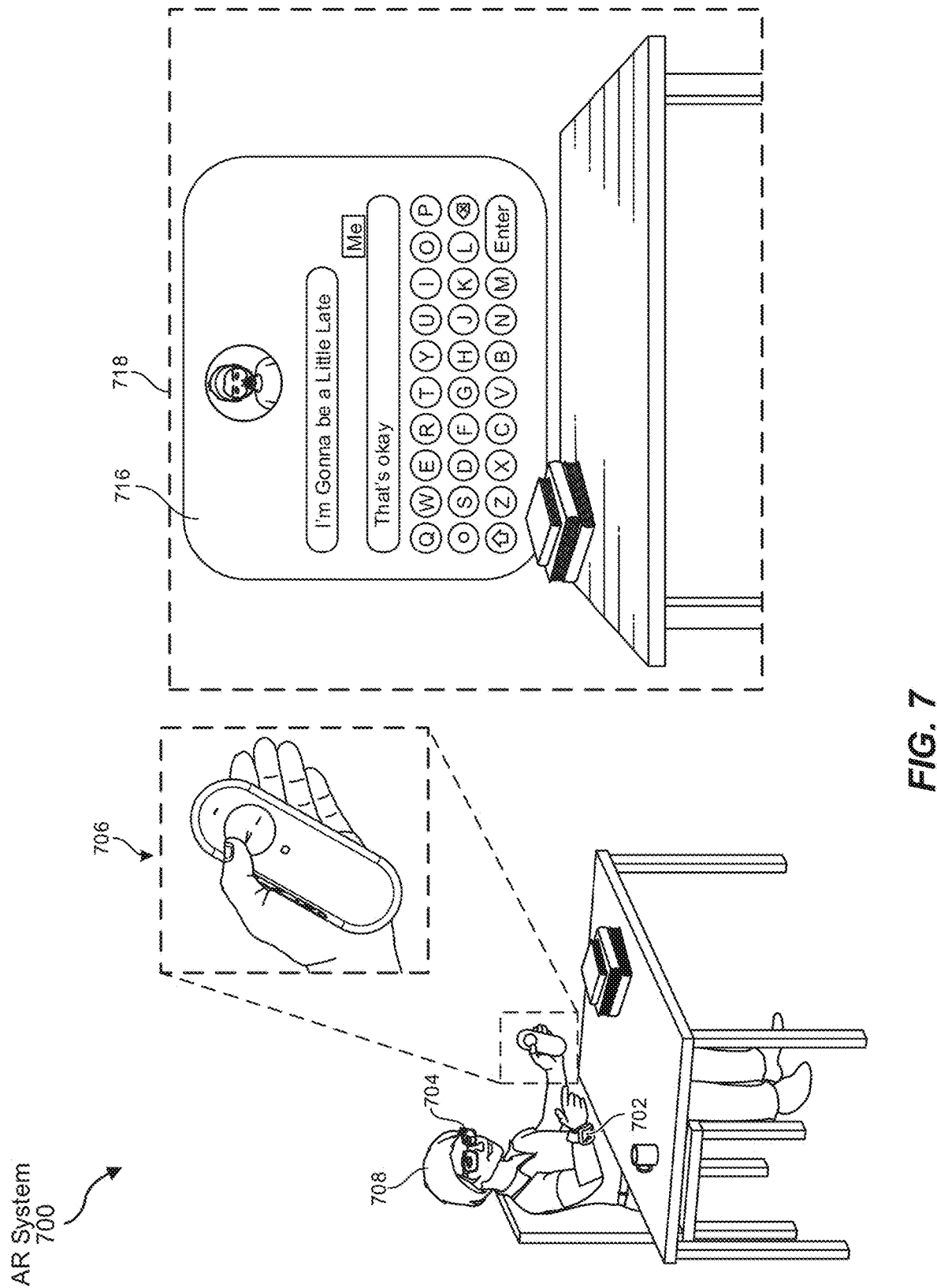
FIG. 7 is an illustration of an example artificial-reality system with a handheld device according to some embodiments of this disclosure.
Figure 8A:
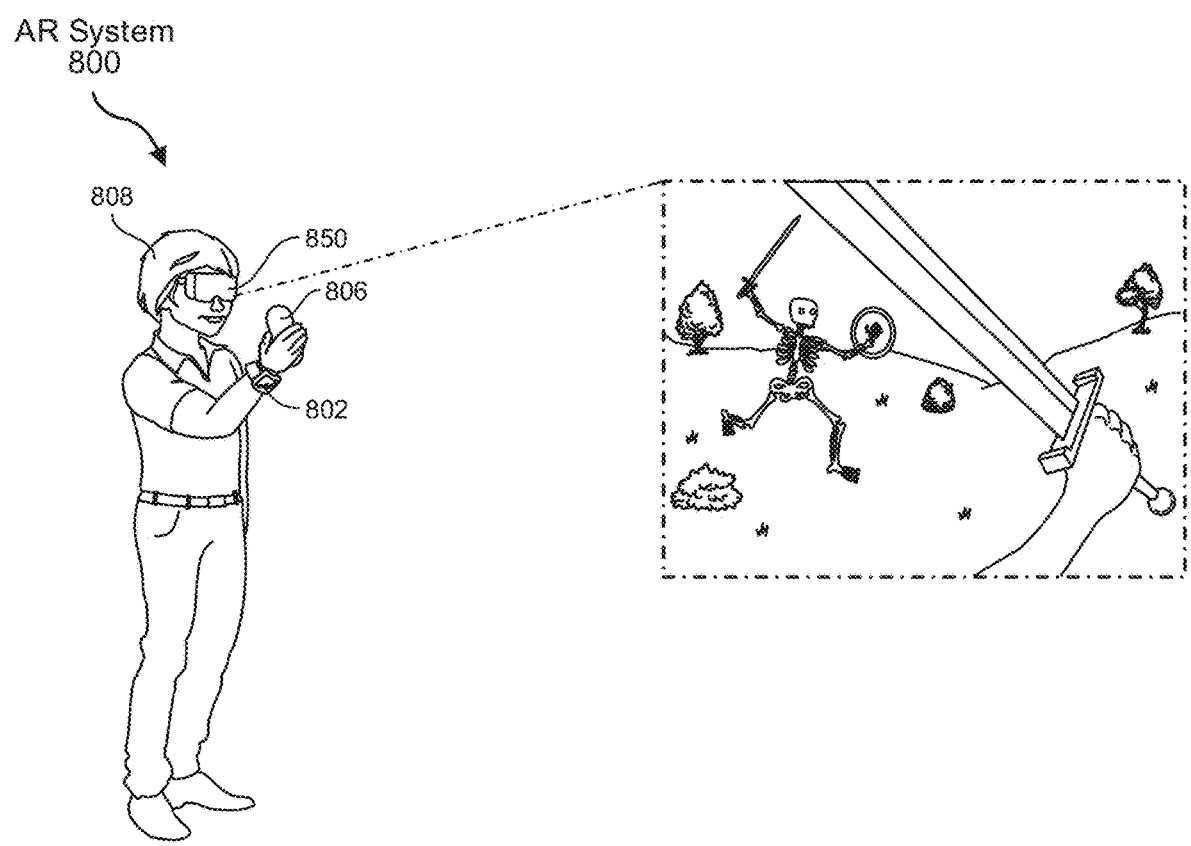
FIG. 8A is an illustration of example user interactions within an artificial-reality system according to some embodiments of this disclosure.
Figure 8B:
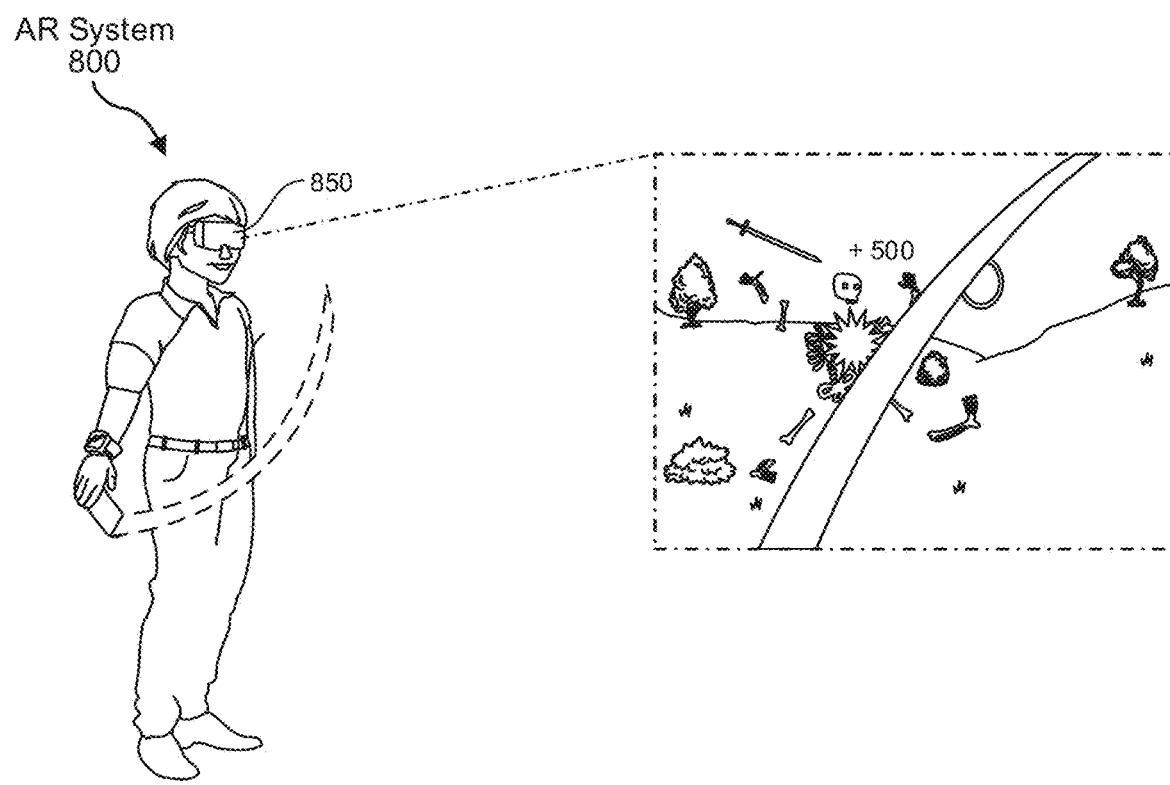
FIG. 8B is an illustration of example user interactions within an artificial-reality system according to some embodiments of this disclosure.
Figure 9A:
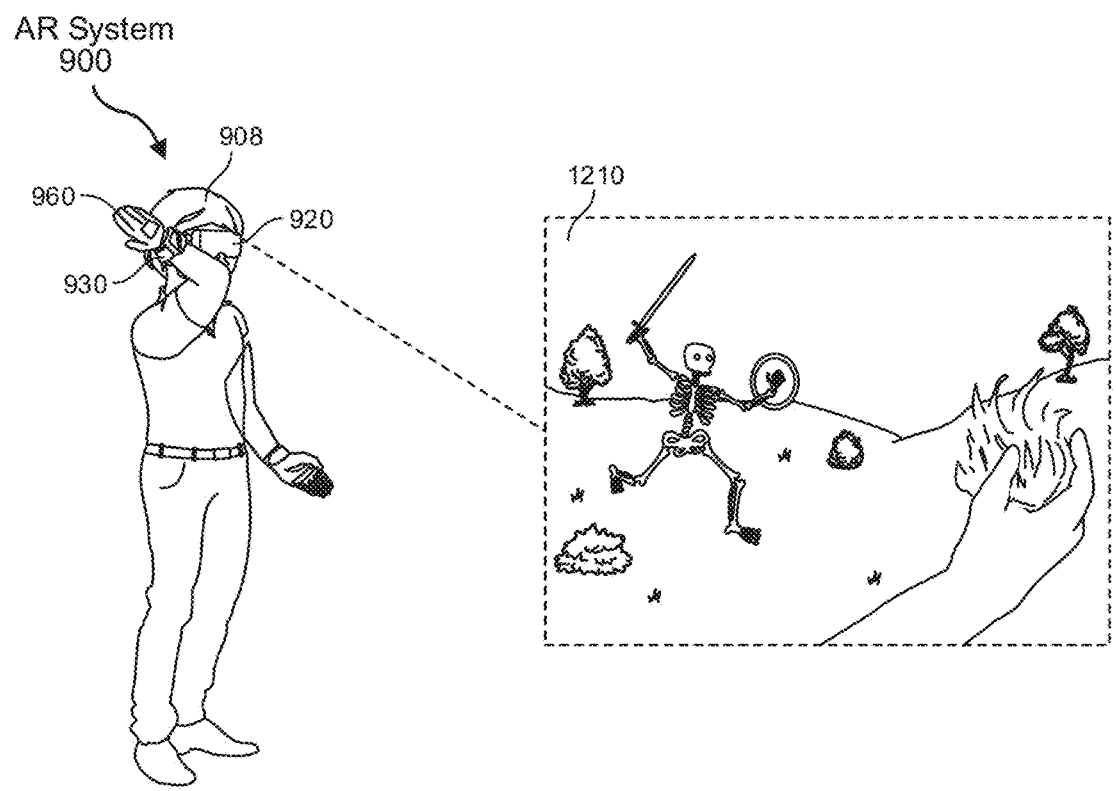
FIG. 9A is an illustration of example user interactions within an artificial-reality system according to some embodiments of this disclosure.
Figure 9B:
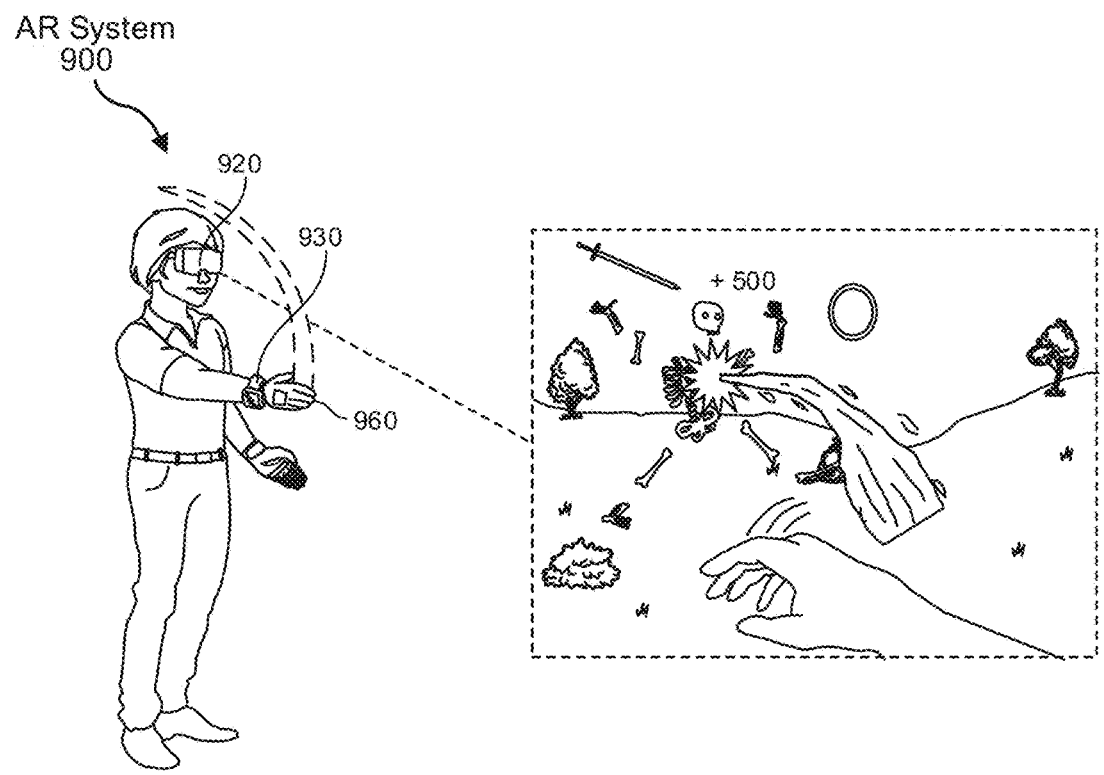
FIG. 9B is an illustration of example user interactions within an artificial-reality system according to some embodiments of this disclosure.

FIGS. 6-9B illustrate example artificial-reality (AR) systems in accordance with some embodiments. FIG. 6 shows a first AR system 600 and first example user interactions using a wrist-wearable device 602, a head-wearable device (e.g., AR system 1200), and/or a handheld intermediary processing device (HIPD) 606. FIG. 7 shows a second AR system 700 and second example user interactions using a wrist-wearable device 702, AR glasses 704, and/or an HIPD 706. FIGS. 8A and 8B show a third AR system 800 and third example user 808 interactions using a wrist-wearable device 802, a head-wearable device (e.g., VR headset 850), and/or an HIPD 806. FIGS. 9A and 9B show a fourth AR system 900 and fourth example user 908 interactions using a wrist-wearable device 930, VR headset 920, and/or a haptic device 960 (e.g., wearable gloves).

A wrist-wearable device 1000, which can be used for wrist-wearable device 602, 702, 802, 930, and one or more of its components, are described below in reference to FIGS. 10 and 11; AR system 1200 and VR system 1300, which can respectively be used for AR glasses 604, 704 or VR headset 850, 920, and their one or more components are described below in reference to FIGS. 12-14.

Referring to FIG. 6, wrist-wearable device 602, AR glasses 604, and/or HIPD 606 can communicatively couple via a network 625 (e.g., cellular, near field, Wi-Fi, personal area network, wireless LAN, etc.). Additionally, wrist-wearable device 602, AR glasses 604, and/or HIPD 606 can also communicatively couple with one or more servers 630, computers 640 (e.g., laptops, computers, etc.), mobile devices 650 (e.g., smartphones, tablets, etc.), and/or other electronic devices via network 625 (e.g., cellular, near field, Wi-Fi, personal area network, wireless LAN, etc.).

In FIG. 6, a user 608 is shown wearing wrist-wearable device 602 and AR glasses 604 and having HIPD 606 on their desk. The wrist-wearable device 602, AR glasses 604, and HIPD 606 facilitate user interaction with an AR environment. In particular, as shown by first AR system 600, wrist-wearable device 602, AR glasses 604, and/or HIPD 606 cause presentation of one or more avatars 610, digital representations of contacts 612, and virtual objects 614. As discussed below, user 608 can interact with one or more avatars 610, digital representations of contacts 612, and virtual objects 614 via wrist-wearable device 602, AR glasses 604, and/or HIPD 606.

User 608 can use any of wrist-wearable device 602, AR glasses 604, and/or HIPD 606 to provide user inputs. For example, user 608 can perform one or more hand gestures that are detected by wrist-wearable device 602 (e.g., using one or more EMG sensors and/or IMUs, described below in reference to FIGS. 10 and 11) and/or AR glasses 604 (e.g., using one or more image sensor or camera, described below in reference to FIGS. 12-14) to provide a user input. Alternatively, or additionally, user 608 can provide a user input via one or more touch surfaces of wrist-wearable device 602, AR glasses 604, HIPD 606, and/or voice commands captured by a microphone of wrist-wearable device 602, AR glasses 604, and/or HIPD 606. In some embodiments, wrist-wearable device 602, AR glasses 604, and/or HIPD 606 include a digital assistant to help user 608 in providing a user input (e.g., completing a sequence of operations, suggesting different operations or commands, providing reminders, confirming a command, etc.). In some embodiments, user 608 can provide a user input via one or more facial gestures and/or facial expressions. For example, cameras of wrist-wearable device 602, AR glasses 604, and/or HIPD 606 can track eyes of user 608 for navigating a user interface.

Wrist-wearable device 602, AR glasses 604, and/or HIPD 606 can operate alone or in conjunction to allow user 608 to interact with the AR environment. In some embodiments, HIPD 606 is configured to operate as a central hub or control center for the wrist-wearable device 602, AR glasses 604, and/or another communicatively coupled device. For example, user 608 can provide an input to interact with the AR environment at any of wrist-wearable device 602, AR glasses 604, and/or HIPD 606, and HIPD 606 can identify one or more back-end and front-end tasks to cause the performance of the requested interaction and distribute instructions to cause the performance of the one or more back-end and front-end tasks at wrist-wearable device 602, AR glasses 604, and/or HIPD 606. In some embodiments, a back-end task is a background processing task that is not perceptible by the user (e.g., rendering content, decompression, compression, etc.), and a front-end task is a user-facing task that is perceptible to the user (e.g., presenting information to the user, providing feedback to the user, etc.). As described below, HIPD 606 can perform the back-end tasks and provide wrist-wearable device 602 and/or AR glasses 604 operational data corresponding to the performed back-end tasks such that wrist-wearable device 602 and/or AR glasses 604 can perform the front-end tasks. In this way, HIPD 606, which has more computational resources and greater thermal headroom than wrist-wearable device 602 and/or AR glasses 604, performs computationally intensive tasks and reduces the computer resource utilization and/or power usage of wrist-wearable device 602 and/or AR glasses 604.

In the example shown by first AR system 600, HIPD 606 identifies one or more back-end tasks and front-end tasks associated with a user request to initiate an AR video call with one or more other users (represented by avatar 610 and the digital representation of contact 612) and distributes instructions to cause the performance of the one or more back-end tasks and front-end tasks. In particular, HIPD 606 performs back-end tasks for processing and/or rendering image data (and other data) associated with the AR video call and provides operational data associated with the performed back-end tasks to AR glasses 604 such that the AR glasses 604 perform front-end tasks for presenting the AR video call (e.g., presenting avatar 610 and digital representation of contact 612).

In some embodiments, HIPD 606 can operate as a focal or anchor point for causing the presentation of information. This allows user 608 to be generally aware of where information is presented. For example, as shown in first AR system 600, avatar 610 and the digital representation of contact 612 are presented above HIPD 606. In particular, HIPD 606 and AR glasses 604 operate in conjunction to determine a location for presenting avatar 610 and the digital representation of contact 612. In some embodiments, information can be presented a predetermined distance from HIPD 606 (e.g., within 5 meters). For example, as shown in first AR system 600, virtual object 614 is presented on the desk some distance from HIPD 606. Similar to the above example, HIPD 606 and AR glasses 604 can operate in conjunction to determine a location for presenting virtual object 614. Alternatively, in some embodiments, presentation of information is not bound by HIPD 606. More specifically, avatar 610, digital representation of contact 612, and virtual object 614 do not have to be presented within a predetermined distance of HIPD 606.

User inputs provided at wrist-wearable device 602, AR glasses 604, and/or HIPD 606 are coordinated such that the user can use any device to initiate, continue, and/or complete an operation. For example, user 608 can provide a user input to AR glasses 604 to cause AR glasses 604 to present virtual object 614 and, while virtual object 614 is presented by AR glasses 604, user 608 can provide one or more hand gestures via wrist-wearable device 602 to interact and/or manipulate virtual object 614.

FIG. 7 shows a user 708 wearing a wrist-wearable device 702 and AR glasses 704, and holding an HIPD 706. In second AR system 700, the wrist-wearable device 702, AR glasses 704, and/or HIPD 706 are used to receive and/or provide one or more messages to a contact of user 708. In particular, wrist-wearable device 702, AR glasses 704, and/or HIPD 706 detect and coordinate one or more user inputs to initiate a messaging application and prepare a response to a received message via the messaging application.

In some embodiments, user 708 initiates, via a user input, an application on wrist-wearable device 702, AR glasses 704, and/or HIPD 706 that causes the application to initiate on at least one device. For example, in second AR system 700, user 708 performs a hand gesture associated with a command for initiating a messaging application (represented by messaging user interface 716), wrist-wearable device 702 detects the hand gesture and, based on a determination that user 708 is wearing AR glasses 704, causes AR glasses 704 to present a messaging user interface 716 of the messaging application. AR glasses 704 can present messaging user interface 716 to user 708 via its display (e.g., as shown by a field of view 718 of user 708). In some embodiments, the application is initiated and executed on the device (e.g., wrist-wearable device 702, AR glasses 704, and/or HIPD 706) that detects the user input to initiate the application, and the device provides another device operational data to cause the presentation of the messaging application. For example, wrist-wearable device 702 can detect the user input to initiate a messaging application, initiate and run the messaging application, and provide operational data to AR glasses 704 and/or HIPD 706 to cause presentation of the messaging application. Alternatively, the application can be initiated and executed at a device other than the device that detected the user input. For example, wrist-wearable device 702 can detect the hand gesture associated with initiating the messaging application and cause HIPD 706 to run the messaging application and coordinate the presentation of the messaging application.

Further, user 708 can provide a user input provided at wrist-wearable device 702, AR glasses 704, and/or HIPD 706 to continue and/or complete an operation initiated at another device. For example, after initiating the messaging application via wrist-wearable device 702 and while AR glasses 704 present messaging user interface 716, user 708 can provide an input at HIPD 706 to prepare a response (e.g., shown by the swipe gesture performed on HIPD 706). Gestures performed by user 708 on HIPD 706 can be provided and/or displayed on another device. For example, a swipe gestured performed on HIPD 706 is displayed on a virtual keyboard of messaging user interface 716 displayed by AR glasses 704.

In some embodiments, wrist-wearable device 702, AR glasses 704, HIPD 706, and/or any other communicatively coupled device can present one or more notifications to user 708. The notification can be an indication of a new message, an incoming call, an application update, a status update, etc. User 708 can select the notification via wrist-wearable device 702, AR glasses 704, and/or HIPD 706 and can cause presentation of an application or operation associated with the notification on at least one device. For example, user 708 can receive a notification that a message was received at wrist-wearable device 702, AR glasses 704, HIPD 706, and/or any other communicatively coupled device and can then provide a user input at wrist-wearable device 702, AR glasses 704, and/or HIPD 706 to review the notification, and the device detecting the user input can cause an application associated with the notification to be initiated and/or presented at wrist-wearable device 702, AR glasses 704, and/or HIPD 706.

While the above example describes coordinated inputs used to interact with a messaging application, user inputs can be coordinated to interact with any number of applications including, but not limited to, gaming applications, social media applications, camera applications, web-based applications, financial applications, etc. For example, AR glasses 704 can present to user 708 game application data, and HIPD 706 can be used as a controller to provide inputs to the game. Similarly, user 708 can use wrist-wearable device 702 to initiate a camera of AR glasses 704, and user 308 can use wrist-wearable device 702, AR glasses 704, and/or HIPD 706 to manipulate the image capture (e.g., zoom in or out, apply filters, etc.) and capture image data.

Users may interact with the devices disclosed herein in a variety of ways. For example, as shown in FIGS. 8A and 8B, a user 808 may interact with an AR system 800 by donning a VR headset 850 while holding HIPD 806 and wearing wrist-wearable device 802. In this example, AR system 800 may enable a user to interact with a game 810 by swiping their arm. One or more of VR headset 850, HIPD 806, and wrist-wearable device 802 may detect this gesture and, in response, may display a sword strike in game 810. Similarly, in FIGS. 9A and 9B, a user 908 may interact with an AR system 900 by donning a VR headset 920 while wearing haptic device 960 and wrist-wearable device 930. In this example, AR system 900 may enable a user to interact with a game 910 by swiping their arm. One or more of VR headset 920, haptic device 960, and wrist-wearable device 930 may detect this gesture and, in response, may display a spell being cast in game 810.

Having discussed example AR systems, devices for interacting with such AR systems and other computing systems more generally will now be discussed in greater detail. Some explanations of devices and components that can be included in some or all of the example devices discussed below are explained herein for ease of reference. Certain types of the components described below may be more suitable for a particular set of devices, and less suitable for a different set of devices. But subsequent reference to the components explained here should be considered to be encompassed by the descriptions provided.

In some embodiments discussed below, example devices and systems, including electronic devices and systems, will be addressed. Such example devices and systems are not intended to be limiting, and one of skill in the art will understand that alternative devices and systems to the example devices and systems described herein may be used to perform the operations and construct the systems and devices that are described herein.

An electronic device may be a device that uses electrical energy to perform a specific function. An electronic device can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device may be a device that sits between two other electronic devices and/or a subset of components of one or more electronic devices and facilitates communication, data processing, and/or data transfer between the respective electronic devices and/or electronic components.

An integrated circuit may be an electronic device made up of multiple interconnected electronic components such as transistors, resistors, and capacitors. These components may be etched onto a small piece of semiconductor material, such as silicon. Integrated circuits may include analog integrated circuits, digital integrated circuits, mixed signal integrated circuits, and/or any other suitable type or form of integrated circuit. Examples of integrated circuits include application-specific integrated circuits (ASICs), processing units, central processing units (CPUs), co-processors, and accelerators.

Analog integrated circuits, such as sensors, power management circuits, and operational amplifiers, may process continuous signals and perform analog functions such as amplification, active filtering, demodulation, and mixing. Examples of analog integrated circuits include linear integrated circuits and radio frequency circuits.

Digital integrated circuits, which may be referred to as logic integrated circuits, may include microprocessors, microcontrollers, memory chips, interfaces, power management circuits, programmable devices, and/or any other suitable type or form of integrated circuit. In some embodiments, examples of integrated circuits include central processing units (CPUs), Processing units, such as CPUs, may be electronic components that are responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) an accelerator, such as a graphics processing unit (GPU), designed to accelerate the creation and rendering of images, videos, and animations (e.g., virtual-reality animations, such as three-dimensional modeling); (iv) a field-programmable gate array (FPGA) that can be programmed and reconfigured after manufacturing and/or can be customized to perform specific tasks, such as signal processing, cryptography, and machine learning; and/or (v) a digital signal processor (DSP) designed to perform mathematical operations on signals such as audio, video, and radio waves. One or more processors of one or more electronic devices may be used in various embodiments described herein.

Memory generally refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders) and/or semi-permanently; (iii) flash memory, which can be configured to store data in electronic devices (e.g., USB drives, memory cards, and/or solid-state drives (SSDs)); and/or (iv) cache memory configured to temporarily store frequently accessed data and instructions. Memory, as described herein, can store structured data (e.g., SQL databases, MongoDB databases, GraphQL data, JSON data, etc.). Other examples of data stored in memory can include (i) profile data, including user account data, user settings, and/or other user data stored by the user, (ii) sensor data detected and/or otherwise obtained by one or more sensors, (iii) media content data including stored image data, audio data, documents, and the like, (iv) application data, which can include data collected and/or otherwise obtained and stored during use of an application, and/or any other types of data described herein.

Controllers may be electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) that may be configured to be used in industrial automation systems to control and monitor manufacturing processes; (iii) system-on-a-chip (SoC) controllers that integrate multiple components such as processors, memory, I/O interfaces, and other peripherals into a single chip; and/or (iv) DSPs.

A power system of an electronic device may be configured to convert incoming electrical power into a form that can be used to operate the device. A power system can include various components, such as (i) a power source, which can be an alternating current (AC) adapter or a direct current (DC) adapter power supply, (ii) a charger input, which can be configured to use a wired and/or wireless connection (which may be part of a peripheral interface, such as a USB, micro-USB interface, near-field magnetic coupling, magnetic inductive and magnetic resonance charging, and/or radio frequency (RF) charging), (iii) a power-management integrated circuit, configured to distribute power to various components of the device and to ensure that the device operates within safe limits (e.g., regulating voltage, controlling current flow, and/or managing heat dissipation), and/or (iv) a battery configured to store power to provide usable power to components of one or more electronic devices.

Peripheral interfaces may be electronic components (e.g., of electronic devices) that allow electronic devices to communicate with other devices or peripherals and can provide the ability to input and output data and signals. Examples of peripheral interfaces can include (i) universal serial bus (USB) and/or micro-USB interfaces configured for connecting devices to an electronic device, (ii) Bluetooth interfaces configured to allow devices to communicate with each other, including Bluetooth low energy (BLE), (iii) near field communication (NFC) interfaces configured to be short-range wireless interfaces for operations such as access control, (iv) POGO pins, which may be small, spring-loaded pins configured to provide a charging interface, (v) wireless charging interfaces, (vi) GPS interfaces, (vii) Wi-Fi interfaces for providing a connection between a device and a wireless network, and/or (viii) sensor interfaces.

Sensors may be electronic components (e.g., in and/or otherwise in electronic communication with electronic devices, such as wearable devices) configured to detect physical and environmental changes and generate electrical signals. Examples of sensors can include (i) imaging sensors for collecting imaging data (e.g., including one or more cameras disposed on a respective electronic device), (ii) biopotential-signal sensors, (iii) inertial measurement units (e.g., IMUs) for detecting, for example, angular rate, force, magnetic field, and/or changes in acceleration, (iv) heart rate sensors for measuring a user's heart rate, (v) SpO2 sensors for measuring blood oxygen saturation and/or other biometric data of a user, (vi) capacitive sensors for detecting changes in potential at a portion of a user's body (e.g., a sensor-skin interface), and/or (vii) light sensors (e.g., time-of-flight sensors, infrared light sensors, visible light sensors, etc.).

Biopotential-signal-sensing components may be devices used to measure electrical activity within the body (e.g., biopotential-signal sensors). Some types of biopotential-signal sensors include (i) electroencephalography (EEG) sensors configured to measure electrical activity in the brain to diagnose neurological disorders, (ii) electrocardiography (ECG or EKG) sensors configured to measure electrical activity of the heart to diagnose heart problems, (iii) electromyography (EMG) sensors configured to measure the electrical activity of muscles and to diagnose neuromuscular disorders, and (iv) electrooculography (EOG) sensors configure to measure the electrical activity of eye muscles to detect eye movement and diagnose eye disorders.

An application stored in memory of an electronic device (e.g., software) may include instructions stored in the memory. Examples of such applications include (i) games, (ii) word processors, (iii) messaging applications, (iv) media-streaming applications, (v) financial applications, (vi) calendars. (vii) clocks, and (viii) communication interface modules for enabling wired and/or wireless connections between different respective electronic devices (e.g., IEEE 1202.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols).

A communication interface may be a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

A graphics module may be a component or software module that is designed to handle graphical operations and/or processes and can include a hardware module and/or a software module.

Non-transitory computer-readable storage media may be physical devices or storage media that can be used to store electronic data in a non-transitory form (e.g., such that the data is stored permanently until it is intentionally deleted or modified).

Figure 10:
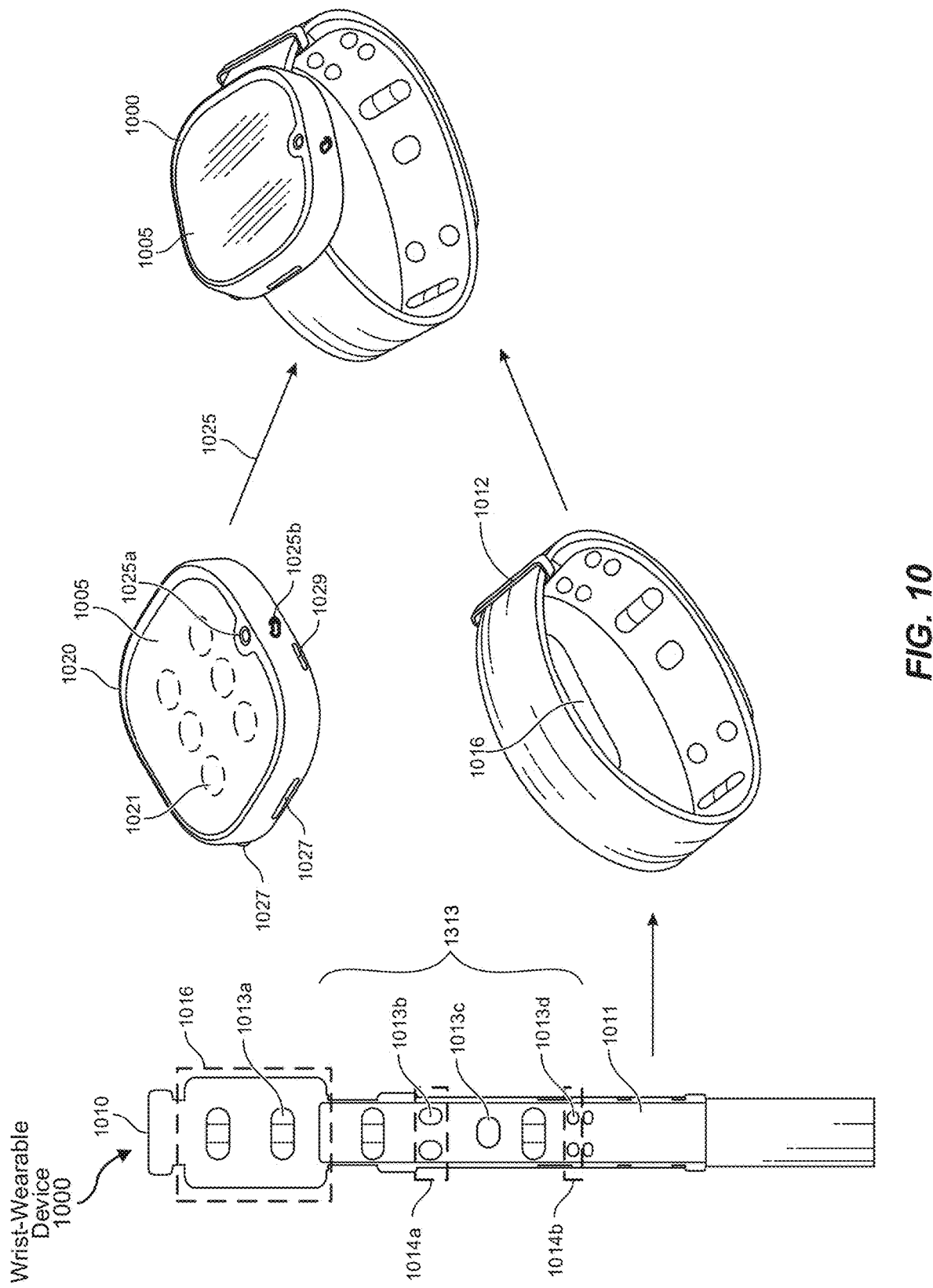
FIG. 10 is an illustration of an example wrist-wearable device of an artificial-reality system according to some embodiments of this disclosure.
Figure 11:
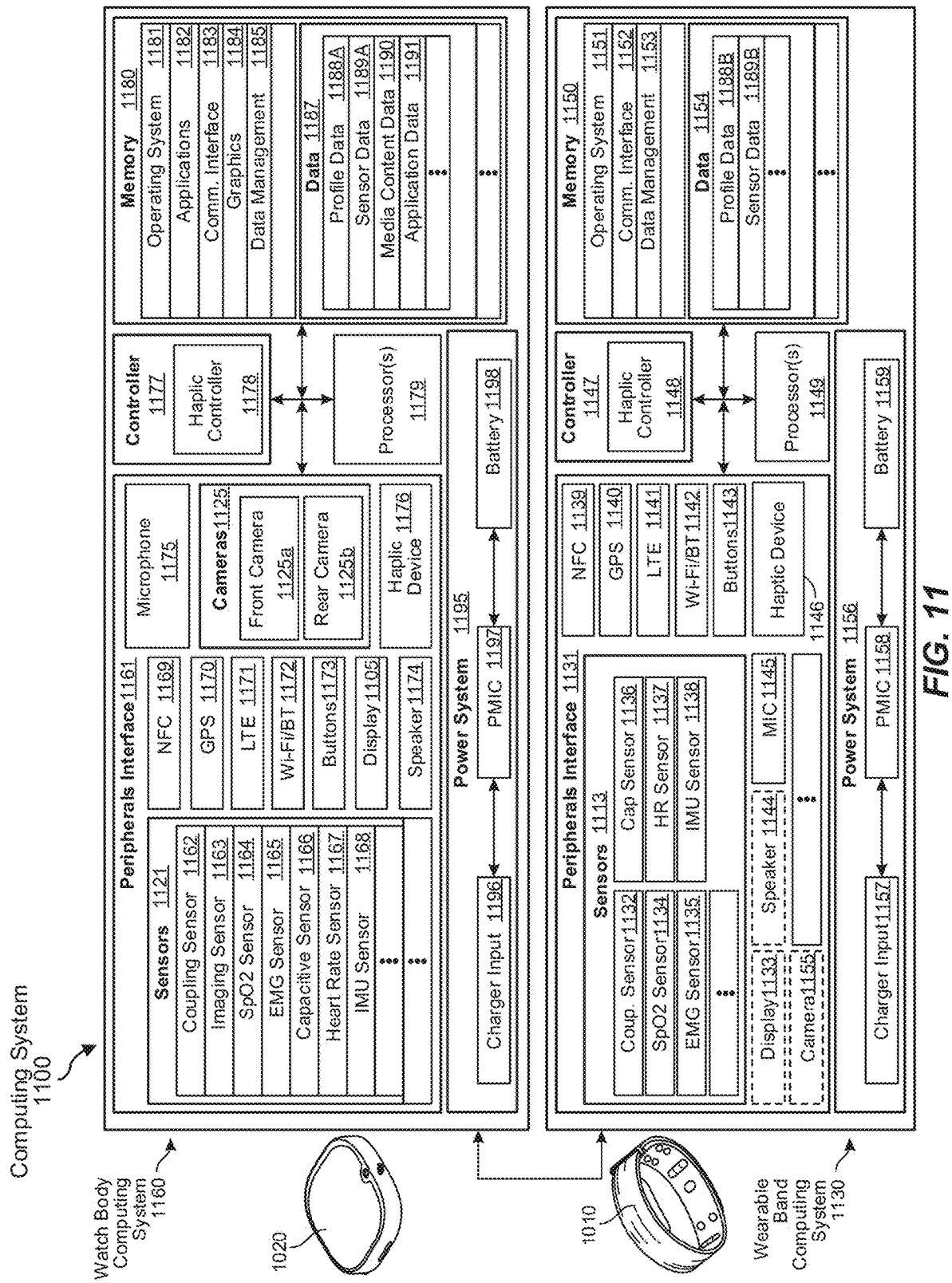
FIG. 11 is an illustration of an example wearable artificial-reality system according to some embodiments of this disclosure.

FIGS. 10 and 11 illustrate an example wrist-wearable device 1000 and an example computer system 1100, in accordance with some embodiments. Wrist-wearable device 1000 is an instance of wearable device 602 described in FIG. 6 herein, such that the wearable device 602 should be understood to have the features of the wrist-wearable device 1000 and vice versa. FIG. 11 illustrates components of the wrist-wearable device 1000, which can be used individually or in combination, including combinations that include other electronic devices and/or electronic components.

FIG. 10 shows a wearable band 1010 and a watch body 1020 (or capsule) being coupled, as discussed below, to form wrist-wearable device 1000. Wrist-wearable device 1000 can perform various functions and/or operations associated with navigating through user interfaces and selectively opening applications as well as the functions and/or operations described above with reference to FIGS. 6-9B.

As will be described in more detail below, operations executed by wrist-wearable device 1000 can include (i) presenting content to a user (e.g., displaying visual content via a display 1005), (ii) detecting (e.g., sensing) user input (e.g., sensing a touch on peripheral button 1023 and/or at a touch screen of the display 1005, a hand gesture detected by sensors (e.g., biopotential sensors)), (iii) sensing biometric data (e.g., neuromuscular signals, heart rate, temperature, sleep, etc.) via one or more sensors 1013, messaging (e.g., text, speech, video, etc.); image capture via one or more imaging devices or cameras 1025, wireless communications (e.g., cellular, near field, Wi-Fi, personal area network, etc.), location determination, financial transactions, providing haptic feedback, providing alarms, providing notifications, providing biometric authentication, providing health monitoring, providing sleep monitoring, etc.

The above-example functions can be executed independently in watch body 1020, independently in wearable band 1010, and/or via an electronic communication between watch body 1020 and wearable band 1010. In some embodiments, functions can be executed on wrist-wearable device 1000 while an AR environment is being presented (e.g., via one of AR systems 600 to 900). The wearable devices described herein can also be used with other types of AR environments.

Wearable band 1010 can be configured to be worn by a user such that an inner surface of a wearable structure 1011 of wearable band 1010 is in contact with the user's skin. In this example, when worn by a user, sensors 1013 may contact the user's skin. In some examples, one or more of sensors 1013 can sense biometric data such as a user's heart rate, a saturated oxygen level, temperature, sweat level, neuromuscular signals, or a combination thereof. One or more of sensors 1013 can also sense data about a user's environment including a user's motion, altitude, location, orientation, gait, acceleration, position, or a combination thereof. In some embodiment, one or more of sensors 1013 can be configured to track a position and/or motion of wearable band 1010. One or more of sensors 1013 can include any of the sensors defined above and/or discussed below with respect to FIG. 10.

One or more of sensors 1013 can be distributed on an inside and/or an outside surface of wearable band 1010. In some embodiments, one or more of sensors 1013 are uniformly spaced along wearable band 1010. Alternatively, in some embodiments, one or more of sensors 1013 are positioned at distinct points along wearable band 1010. As shown in FIG. 10, one or more of sensors 1013 can be the same or distinct. For example, in some embodiments, one or more of sensors 1013 can be shaped as a pill (e.g., sensor 1013a), an oval, a circle a square, an oblong (e.g., sensor 1013c) and/or any other shape that maintains contact with the user's skin (e.g., such that neuromuscular signal and/or other biometric data can be accurately measured at the user's skin). In some embodiments, one or more sensors of 1013 are aligned to form pairs of sensors (e.g., for sensing neuromuscular signals based on differential sensing within each respective sensor). For example, sensor 1013b may be aligned with an adjacent sensor to form sensor pair 1014a and sensor 1013d may be aligned with an adjacent sensor to form sensor pair 1014b. In some embodiments, wearable band 1010 does not have a sensor pair. Alternatively, in some embodiments, wearable band 1010 has a predetermined number of sensor pairs (one pair of sensors, three pairs of sensors, four pairs of sensors, six pairs of sensors, sixteen pairs of sensors, etc.).

Wearable band 1010 can include any suitable number of sensors 1013. In some embodiments, the number and arrangement of sensors 1013 depends on the particular application for which wearable band 1010 is used. For instance, wearable band 1010 can be configured as an armband, wristband, or chest-band that include a plurality of sensors 1013 with different number of sensors 1013, a variety of types of individual sensors with the plurality of sensors 1013, and different arrangements for each use case, such as medical use cases as compared to gaming or general day-to-day use cases.

In accordance with some embodiments, wearable band 1010 further includes an electrical ground electrode and a shielding electrode. The electrical ground and shielding electrodes, like the sensors 1013, can be distributed on the inside surface of the wearable band 1010 such that they contact a portion of the user's skin. For example, the electrical ground and shielding electrodes can be at an inside surface of a coupling mechanism 1016 or an inside surface of a wearable structure 1011. The electrical ground and shielding electrodes can be formed and/or use the same components as sensors 1013. In some embodiments, wearable band 1010 includes more than one electrical ground electrode and more than one shielding electrode.

Sensors 1013 can be formed as part of wearable structure 1011 of wearable band 1010. In some embodiments, sensors 1013 are flush or substantially flush with wearable structure 1011 such that they do not extend beyond the surface of wearable structure 1011. While flush with wearable structure 1011, sensors 1013 are still configured to contact the user's skin (e.g., via a skin-contacting surface). Alternatively, in some embodiments, sensors 1013 extend beyond wearable structure 1011 a predetermined distance (e.g., 0.1-2 mm) to make contact and depress into the user's skin. In some embodiment, sensors 1013 are coupled to an actuator (not shown) configured to adjust an extension height (e.g., a distance from the surface of wearable structure 1011) of sensors 1013 such that sensors 1013 make contact and depress into the user's skin. In some embodiments, the actuators adjust the extension height between 0.01 mm-1.2 mm. This may allow a user to customize the positioning of sensors 1013 to improve the overall comfort of the wearable band 1010 when worn while still allowing sensors 1013 to contact the user's skin. In some embodiments, sensors 1013 are indistinguishable from wearable structure 1011 when worn by the user.

Wearable structure 1011 can be formed of an elastic material, elastomers, etc., configured to be stretched and fitted to be worn by the user. In some embodiments, wearable structure 1011 is a textile or woven fabric. As described above, sensors 1013 can be formed as part of a wearable structure 1011. For example, sensors 1013 can be molded into the wearable structure 1011, be integrated into a woven fabric (e.g., sensors 1013 can be sewn into the fabric and mimic the pliability of fabric and can and/or be constructed from a series woven strands of fabric).

Wearable structure 1011 can include flexible electronic connectors that interconnect sensors 1013, the electronic circuitry, and/or other electronic components (described below in reference to FIG. 11) that are enclosed in wearable band 1010. In some embodiments, the flexible electronic connectors are configured to interconnect sensors 1013, the electronic circuitry, and/or other electronic components of wearable band 1010 with respective sensors and/or other electronic components of another electronic device (e.g., watch body 1020). The flexible electronic connectors are configured to move with wearable structure 1011 such that the user adjustment to wearable structure 1011 (e.g., resizing, pulling, folding, etc.) does not stress or strain the electrical coupling of components of wearable band 1010.

As described above, wearable band 1010 is configured to be worn by a user. In particular, wearable band 1010 can be shaped or otherwise manipulated to be worn by a user. For example, wearable band 1010 can be shaped to have a substantially circular shape such that it can be configured to be worn on the user's lower arm or wrist. Alternatively, wearable band 1010 can be shaped to be worn on another body part of the user, such as the user's upper arm (e.g., around a bicep), forearm, chest, legs, etc. Wearable band 1010 can include a retaining mechanism 1012 (e.g., a buckle, a hook and loop fastener, etc.) for securing wearable band 1010 to the user's wrist or other body part. While wearable band 1010 is worn by the user, sensors 1013 sense data (referred to as sensor data) from the user's skin. In some examples, sensors 1013 of wearable band 1010 obtain (e.g., sense and record) neuromuscular signals.

The sensed data (e.g., sensed neuromuscular signals) can be used to detect and/or determine the user's intention to perform certain motor actions. In some examples, sensors 1013 may sense and record neuromuscular signals from the user as the user performs muscular activations (e.g., movements, gestures, etc.). The detected and/or determined motor actions (e.g., phalange (or digit) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on display 1005 of wrist-wearable device 1000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table, dynamic gestures, such as grasping a physical or virtual object, and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by sensors 1013 can be used to provide a user with an enhanced interaction with a physical object (e.g., devices communicatively coupled with wearable band 1010) and/or a virtual object in an artificial-reality application generated by an artificial-reality system (e.g., user interface objects presented on the display 1005, or another computing device (e.g., a smartphone)).

In some embodiments, wearable band 1010 includes one or more haptic devices 1146 (e.g., a vibratory haptic actuator) that are configured to provide haptic feedback (e.g., a cutaneous and/or kinesthetic sensation, etc.) to the user's skin. Sensors 1013 and/or haptic devices 1146 (shown in FIG. 11) can be configured to operate in conjunction with multiple applications including, without limitation, health monitoring, social media, games, and artificial reality (e.g., the applications associated with artificial reality).

Wearable band 1010 can also include coupling mechanism 1016 for detachably coupling a capsule (e.g., a computing unit) or watch body 1020 (via a coupling surface of the watch body 1020) to wearable band 1010. For example, a cradle or a shape of coupling mechanism 1016 can correspond to shape of watch body 1020 of wrist-wearable device 1000. In particular, coupling mechanism 1016 can be configured to receive a coupling surface proximate to the bottom side of watch body 1020 (e.g., a side opposite to a front side of watch body 1020 where display 1005 is located), such that a user can push watch body 1020 downward into coupling mechanism 1016 to attach watch body 1020 to coupling mechanism 1016. In some embodiments, coupling mechanism 1016 can be configured to receive a top side of the watch body 1020 (e.g., a side proximate to the front side of watch body 1020 where display 1005 is located) that is pushed upward into the cradle, as opposed to being pushed downward into coupling mechanism 1016. In some embodiments, coupling mechanism 1016 is an integrated component of wearable band 1010 such that wearable band 1010 and coupling mechanism 1016 are a single unitary structure. In some embodiments, coupling mechanism 1016 is a type of frame or shell that allows watch body 1020 coupling surface to be retained within or on wearable band 1010 coupling mechanism 1016 (e.g., a cradle, a tracker band, a support base, a clasp, etc.).

Coupling mechanism 1016 can allow for watch body 1020 to be detachably coupled to the wearable band 1010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 1020 to wearable band 1010 and to decouple the watch body 1020 from the wearable band 1010. For example, a user can twist, slide, turn, push, pull, or rotate watch body 1020 relative to wearable band 1010, or a combination thereof, to attach watch body 1020 to wearable band 1010 and to detach watch body 1020 from wearable band 1010. Alternatively, as discussed below, in some embodiments, the watch body 1020 can be decoupled from the wearable band 1010 by actuation of a release mechanism 1029.

Wearable band 1010 can be coupled with watch body 1020 to increase the functionality of wearable band 1010

(e.g., converting wearable band 1010 into wrist-wearable device 1000, adding an additional computing unit and/or battery to increase computational resources and/or a battery life of wearable band 1010, adding additional sensors to improve sensed data, etc.). As described above, wearable band 1010 and coupling mechanism 1016 are configured to operate independently (e.g., execute functions independently) from watch body 1020. For example, coupling mechanism 1016 can include one or more sensors 1013 that contact a user's skin when wearable band 1010 is worn by the user, with or without watch body 1020 and can provide sensor data for determining control commands.

A user can detach watch body 1020 from wearable band 1010 to reduce the encumbrance of wrist-wearable device 1000 to the user. For embodiments in which watch body 1020 is removable, watch body 1020 can be referred to as a removable structure, such that in these embodiments wrist-wearable device 1000 includes a wearable portion (e.g., wearable band 1010) and a removable structure (e.g., watch body 1020).

Turning to watch body 1020, in some examples watch body 1020 can have a substantially rectangular or circular shape. Watch body 1020 is configured to be worn by the user on their wrist or on another body part. More specifically, watch body 1020 is sized to be easily carried by the user, attached on a portion of the user's clothing, and/or coupled to wearable band 1010 (forming the wrist-wearable device 1000). As described above, watch body 1020 can have a shape corresponding to coupling mechanism 1016 of wearable band 1010. In some embodiments, watch body 1020 includes a single release mechanism 1029 or multiple release mechanisms (e.g., two release mechanisms 1029 positioned on opposing sides of watch body 1020, such as spring-loaded buttons) for decoupling watch body 1020 from wearable band 1010. Release mechanism 1029 can include, without limitation, a button, a knob, a plunger, a handle, a lever, a fastener, a clasp, a dial, a latch, or a combination thereof.

A user can actuate release mechanism 1029 by pushing, turning, lifting, depressing, shifting, or performing other actions on release mechanism 1029. Actuation of release mechanism 1029 can release (e.g., decouple) watch body 1020 from coupling mechanism 1016 of wearable band 1010, allowing the user to use watch body 1020 independently from wearable band 1010 and vice versa. For example, decoupling watch body 1020 from wearable band 1010 can allow a user to capture images using rear-facing camera 1025b. Although release mechanism 1029 is shown positioned at a corner of watch body 1020, release mechanism 1029 can be positioned anywhere on watch body 1020 that is convenient for the user to actuate. In addition, in some embodiments, wearable band 1010 can also include a respective release mechanism for decoupling watch body 1020 from coupling mechanism 1016. In some embodiments, release mechanism 1029 is optional and watch body 1020 can be decoupled from coupling mechanism 1016 as described above (e.g., via twisting, rotating, etc.).

Watch body 1020 can include one or more peripheral buttons 1023 and 1027 for performing various operations at watch body 1020. For example, peripheral buttons 1023 and 1027 can be used to turn on or wake (e.g., transition from a sleep state to an active state) display 1005, unlock watch body 1020, increase or decrease a volume, increase or decrease a brightness, interact with one or more applications, interact with one or more user interfaces, etc. Additionally or alternatively, in some embodiments, display 1005 operates as a touch screen and allows the user to provide one or more inputs for interacting with watch body 1020.

In some embodiments, watch body 1020 includes one or more sensors 1021. Sensors 1021 of watch body 1020 can be the same or distinct from sensors 1013 of wearable band 1010. Sensors 1021 of watch body 1020 can be distributed on an inside and/or an outside surface of watch body 1020. In some embodiments, sensors 1021 are configured to contact a user's skin when watch body 1020 is worn by the user. For example, sensors 1021 can be placed on the bottom side of watch body 1020 and coupling mechanism 1016 can be a cradle with an opening that allows the bottom side of watch body 1020 to directly contact the user's skin. Alternatively, in some embodiments, watch body 1020 does not include sensors that are configured to contact the user's skin (e.g., including sensors internal and/or external to the watch body 1020 that are configured to sense data of watch body 1020 and the surrounding environment). In some embodiments, sensors 1021 are configured to track a position and/or motion of watch body 1020.

Watch body 1020 and wearable band 1010 can share data using a wired communication method (e.g., a Universal Asynchronous Receiver/Transmitter (UART), a USB transceiver, etc.) and/or a wireless communication method (e.g., near field communication, Bluetooth, etc.). For example, watch body 1020 and wearable band 1010 can share data sensed by sensors 1013 and 1021, as well as application and device specific information (e.g., active and/or available applications, output devices (e.g., displays, speakers, etc.), input devices (e.g., touch screens, microphones, imaging sensors, etc.).

In some embodiments, watch body 1020 can include, without limitation, a front-facing camera 1025a and/or a rear-facing camera 1025b, sensors 1021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 1163), a touch sensor, a sweat sensor, etc.). In some embodiments, watch body 1020 can include one or more haptic devices 1176 (e.g., a vibratory haptic actuator) that is configured to provide haptic feedback (e.g., a cutaneous and/or kinesthetic sensation, etc.) to the user. Sensors 1121 and/or haptic device 1176 can also be configured to operate in conjunction with multiple applications including, without limitation, health monitoring applications, social media applications, game applications, and artificial reality applications (e.g., the applications associated with artificial reality).

As described above, watch body 1020 and wearable band 1010, when coupled, can form wrist-wearable device 1000. When coupled, watch body 1020 and wearable band 1010 may operate as a single device to execute functions (operations, detections, communications, etc.) described herein. In some embodiments, each device may be provided with particular instructions for performing the one or more operations of wrist-wearable device 1000. For example, in accordance with a determination that watch body 1020 does not include neuromuscular signal sensors, wearable band 1010 can include alternative instructions for performing associated instructions (e.g., providing sensed neuromuscular signal data to watch body 1020 via a different electronic device). Operations of wrist-wearable device 1000 can be performed by watch body 1020 alone or in conjunction with wearable band 1010 (e.g., via respective processors and/or hardware components) and vice versa. In some embodiments, operations of wrist-wearable device 1000, watch body 1020, and/or wearable band 1010 can be performed in conjunction with one or more processors and/or hardware components.

As described below with reference to the block diagram of FIG. 11, wearable band 1010 and/or watch body 1020 can each include independent resources required to independently execute functions. For example, wearable band 1010 and/or watch body 1020 can each include a power source (e.g., a battery), a memory, data storage, a processor (e.g., a central processing unit (CPU)), communications, a light source, and/or input/output devices.

FIG. 11 shows block diagrams of a computing system 1130 corresponding to wearable band 1010 and a computing system 1160 corresponding to watch body 1020 according to some embodiments. Computing system 1100 of wrist-wearable device 1000 may include a combination of components of wearable band computing system 1130 and watch body computing system 1160, in accordance with some embodiments.

Watch body 1020 and/or wearable band 1010 can include one or more components shown in watch body computing system 1160. In some embodiments, a single integrated circuit may include all or a substantial portion of the components of watch body computing system 1160 included in a single integrated circuit. Alternatively, in some embodiments, components of the watch body computing system 1160 may be included in a plurality of integrated circuits that are communicatively coupled. In some embodiments, watch body computing system 1160 may be configured to couple (e.g., via a wired or wireless connection) with wearable band computing system 1130, which may allow the computing systems to share components, distribute tasks, and/or perform other operations described herein (individually or as a single device).

Watch body computing system 1160 can include one or more processors 1179, a controller 1177, a peripherals interface 1161, a power system 1195, and memory (e.g., a memory 1180).

Power system 1195 can include a charger input 1196, a power-management integrated circuit (PMIC) 1197, and a battery 1198. In some embodiments, a watch body 1020 and a wearable band 1010 can have respective batteries (e.g., battery 1198 and 1159) and can share power with each other. Watch body 1020 and wearable band 1010 can receive a charge using a variety of techniques. In some embodiments, watch body 1020 and wearable band 1010 can use a wired charging assembly (e.g., power cords) to receive the charge. Alternatively, or in addition, watch body 1020 and/or wearable band 1010 can be configured for wireless charging. For example, a portable charging device can be designed to mate with a portion of watch body 1020 and/or wearable band 1010 and wirelessly deliver usable power to battery 1198 of watch body 1020 and/or battery 1159 of wearable band 1010. Watch body 1020 and wearable band 1010 can have independent power systems (e.g., power system 1195 and 1156, respectively) to enable each to operate independently. Watch body 1020 and wearable band 1010 can also share power (e.g., one can charge the other) via respective PMICs (e.g., PMICs 1197 and 1158) and charger inputs (e.g., 1157 and 1196) that can share power over power and ground conductors and/or over wireless charging antennas.

In some embodiments, peripherals interface 1161 can include one or more sensors 1121. Sensors 1121 can include one or more coupling sensors 1162 for detecting when watch body 1020 is coupled with another electronic device (e.g., a wearable band 1010). Sensors 1121 can include one or more imaging sensors 1163 (e.g., one or more of cameras 1125, and/or separate imaging sensors 1163 (e.g., thermal-imaging sensors)). In some embodiments, sensors 1121 can include one or more SpO2 sensors 1164. In some embodiments, sensors 1121 can include one or more biopotential-signal sensors (e.g., EMG sensors 1165, which may be disposed on an interior, user-facing portion of watch body 1020 and/or wearable band 1010). In some embodiments, sensors 1121 may include one or more capacitive sensors 1166. In some embodiments, sensors 1121 may include one or more heart rate sensors 1167. In some embodiments, sensors 1121 may include one or more IMU sensors 1168. In some embodiments, one or more IMU sensors 1168 can be configured to detect movement of a user's hand or other location where watch body 1020 is placed or held.

In some embodiments, one or more of sensors 1121 may provide an example human-machine interface. For example, a set of neuromuscular sensors, such as EMG sensors 1165, may be arranged circumferentially around wearable band 1010 with an interior surface of EMG sensors 1165 being configured to contact a user's skin. Any suitable number of neuromuscular sensors may be used (e.g., between 2 and 20 sensors). The number and arrangement of neuromuscular sensors may depend on the particular application for which the wearable device is used. For example, wearable band 1010 can be used to generate control information for controlling an augmented reality system, a robot, controlling a vehicle, scrolling through text, controlling a virtual avatar, or any other suitable control task.

In some embodiments, neuromuscular sensors may be coupled together using flexible electronics incorporated into the wireless device, and the output of one or more of the sensing components can be optionally processed using hardware signal processing circuitry (e.g., to perform amplification, filtering, and/or rectification). In other embodiments, at least some signal processing of the output of the sensing components can be performed in software such as processors 1179. Thus, signal processing of signals sampled by the sensors can be performed in hardware, software, or by any suitable combination of hardware and software, as aspects of the technology described herein are not limited in this respect.

Neuromuscular signals may be processed in a variety of ways. For example, the output of EMG sensors 1165 may be provided to an analog front end, which may be configured to perform analog processing (e.g., amplification, noise reduction, filtering, etc.) on the recorded signals. The processed analog signals may then be provided to an analog-to-digital converter, which may convert the analog signals to digital signals that can be processed by one or more computer processors. Furthermore, although this example is as discussed in the context of interfaces with EMG sensors, the embodiments described herein can also be implemented in wearable interfaces with other types of sensors including, but not limited to, mechanomyography (MMG) sensors, sonomyography (SMG) sensors, and electrical impedance tomography (EIT) sensors.

In some embodiments, peripherals interface 1161 includes a near-field communication (NFC) component 1169, a global-position system (GPS) component 1170, a long-term evolution (LTE) component 1171, and/or a Wi-Fi and/or Bluetooth communication component 1172. In some embodiments, peripherals interface 1161 includes one or more buttons 1173 (e.g., peripheral buttons 1023 and 1027 in FIG. 10), which, when selected by a user, cause operation to be performed at watch body 1020. In some embodiments, the peripherals interface 1161 includes one or more indicators, such as a light emitting diode (LED), to provide a user with visual indicators (e.g., message received, low battery, active microphone and/or camera, etc.).

Watch body 1020 can include at least one display 1005 for displaying visual representations of information or data to a user, including user-interface elements and/or three-dimensional virtual objects. The display can also include a touch screen for inputting user inputs, such as touch gestures, swipe gestures, and the like. Watch body 1020 can include at least one speaker 1174 and at least one microphone 1175 for providing audio signals to the user and receiving audio input from the user. The user can provide user inputs through microphone 1175 and can also receive audio output from speaker 1174 as part of a haptic event provided by haptic controller 1178. Watch body 1020 can include at least one camera 1125, including a front camera 1125*a* and a rear camera 1125*b*. Cameras 1125 can include ultra-wide-angle cameras, wide angle cameras, fish-eye cameras, spherical cameras, telephoto cameras, depth-sensing cameras, or other types of cameras.

Watch body computing system 1160 can include one or more haptic controllers 1178 and associated componentry (e.g., haptic devices 1176) for providing haptic events at watch body 1020 (e.g., a vibrating sensation or audio output in response to an event at the watch body 1020). Haptic controllers 1178 can communicate with one or more haptic devices 1176, such as electroacoustic devices, including a speaker of the one or more speakers 1174 and/or other audio components and/or electromechanical devices that convert energy into linear motion such as a motor, solenoid, electroactive polymer, piezoelectric actuator, electrostatic actuator, or other tactile output generating components (e.g., a component that converts electrical signals into tactile outputs on the device). Haptic controller 1178 can provide haptic events to that are capable of being sensed by a user of watch body 1020. In some embodiments, one or more haptic controllers 1178 can receive input signals from an application of applications 1182.

In some embodiments, wearable band computing system 1130 and/or watch body computing system 1160 can include memory 1180, which can be controlled by one or more memory controllers of controllers 1177. In some embodiments, software components stored in memory 1180 include one or more applications 1182 configured to perform operations at the watch body 1020. In some embodiments, one or more applications 1182 may include games, word processors, messaging applications, calling applications, web browsers, social media applications, media streaming applications, financial applications, calendars, clocks, etc. In some embodiments, software components stored in memory 1180 include one or more communication interface modules 1183 as defined above. In some embodiments, software components stored in memory 1180 include one or more graphics modules 1184 for rendering, encoding, and/or decoding audio and/or visual data and one or more data management modules 1185 for collecting, organizing, and/or providing access to data 1187 stored in memory 1180. In some embodiments, one or more of applications 1182 and/or one or more modules can work in conjunction with one another to perform various tasks at the watch body 1020.

In some embodiments, software components stored in memory 1180 can include one or more operating systems 1181 (e.g., a Linux-based operating system, an Android operating system, etc.). Memory 1180 can also include data 1187. Data 1187 can include profile data 1188A, sensor data 1189A, media content data 1190, and application data 1191.

It should be appreciated that watch body computing system 1160 is an example of a computing system within watch body 1020, and that watch body 1020 can have more or fewer components than shown in watch body computing system 1160, can combine two or more components, and/or can have a different configuration and/or arrangement of the components. The various components shown in watch body computing system 1160 are implemented in hardware, software, firmware, or a combination thereof, including one or more signal processing and/or application-specific integrated circuits.

Turning to the wearable band computing system 1130, one or more components that can be included in wearable band 1010 are shown. Wearable band computing system 1130 can include more or fewer components than shown in watch body computing system 1160, can combine two or more components, and/or can have a different configuration and/or arrangement of some or all of the components. In some embodiments, all, or a substantial portion of the components of wearable band computing system 1130 are included in a single integrated circuit. Alternatively, in some embodiments, components of wearable band computing system 1130 are included in a plurality of integrated circuits that are communicatively coupled. As described above, in some embodiments, wearable band computing system 1130 is configured to couple (e.g., via a wired or wireless connection) with watch body computing system 1160, which allows the computing systems to share components, distribute tasks, and/or perform other operations described herein (individually or as a single device).

Wearable band computing system 1130, similar to watch body computing system 1160, can include one or more processors 1149, one or more controllers 1147 (including one or more haptics controllers 1148), a peripherals interface 1131 that can includes one or more sensors 1113 and other peripheral devices, a power source (e.g., a power system 1156), and memory (e.g., a memory 1150) that includes an operating system (e.g., an operating system 1151), data (e.g., data 1154 including profile data 1188B, sensor data 1189B, etc.), and one or more modules (e.g., a communications interface module 1152, a data management module 1153, etc.).

One or more of sensors 1113 can be analogous to sensors 1121 of watch body computing system 1160. For example, sensors 1113 can include one or more coupling sensors 1132, one or more SpO2 sensors 1134, one or more EMG sensors 1135, one or more capacitive sensors 1136, one or more heart rate sensors 1137, and one or more IMU sensors 1138.

Peripherals interface 1131 can also include other components analogous to those included in peripherals interface 1161 of watch body computing system 1160, including an NFC component 1139, a GPS component 1140, an LTE component 1141, a Wi-Fi and/or Bluetooth communication component 1142, and/or one or more haptic devices 1146 as described above in reference to peripherals interface 1161. In some embodiments, peripherals interface 1131 includes one or more buttons 1143, a display 1133, a speaker 1144, a microphone 1145, and a camera 1155. In some embodiments, peripherals interface 1131 includes one or more indicators, such as an LED.

It should be appreciated that wearable band computing system 1130 is an example of a computing system within wearable band 1010, and that wearable band 1010 can have more or fewer components than shown in wearable band computing system 1130, combine two or more components, and/or have a different configuration and/or arrangement of the components. The various components shown in wearable band computing system 1130 can be implemented in one or more of a combination of hardware, software, or firmware, including one or more signal processing and/or application-specific integrated circuits.

Wrist-wearable device 1000 with respect to FIG. 10 is an example of wearable band 1010 and watch body 1020 coupled together, so wrist-wearable device 1000 will be understood to include the components shown and described for wearable band computing system 1130 and watch body computing system 1160. In some embodiments, wrist-wearable device 1000 has a split architecture (e.g., a split mechanical architecture, a split electrical architecture, etc.) between watch body 1020 and wearable band 1010. In other words, all of the components shown in wearable band computing system 1130 and watch body computing system 1160 can be housed or otherwise disposed in a combined wrist-wearable device 1000 or within individual components of watch body 1020, wearable band 1010, and/or portions thereof (e.g., a coupling mechanism 1016 of wearable band 1010).

The techniques described above can be used with any device for sensing neuromuscular signals but could also be used with other types of wearable devices for sensing neuromuscular signals (such as body-wearable or head-wearable devices that might have neuromuscular sensors closer to the brain or spinal column).

In some embodiments, wrist-wearable device 1000 can be used in conjunction with a head-wearable device (e.g., AR system 1200 and VR system 1300) and/or an HIPD as described below, and wrist-wearable device 1000 can also be configured to be used to allow a user to control any aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable devices, attention will now be turned to example head-wearable devices, such AR system 1200 and VR system 1300.

Figure 12:
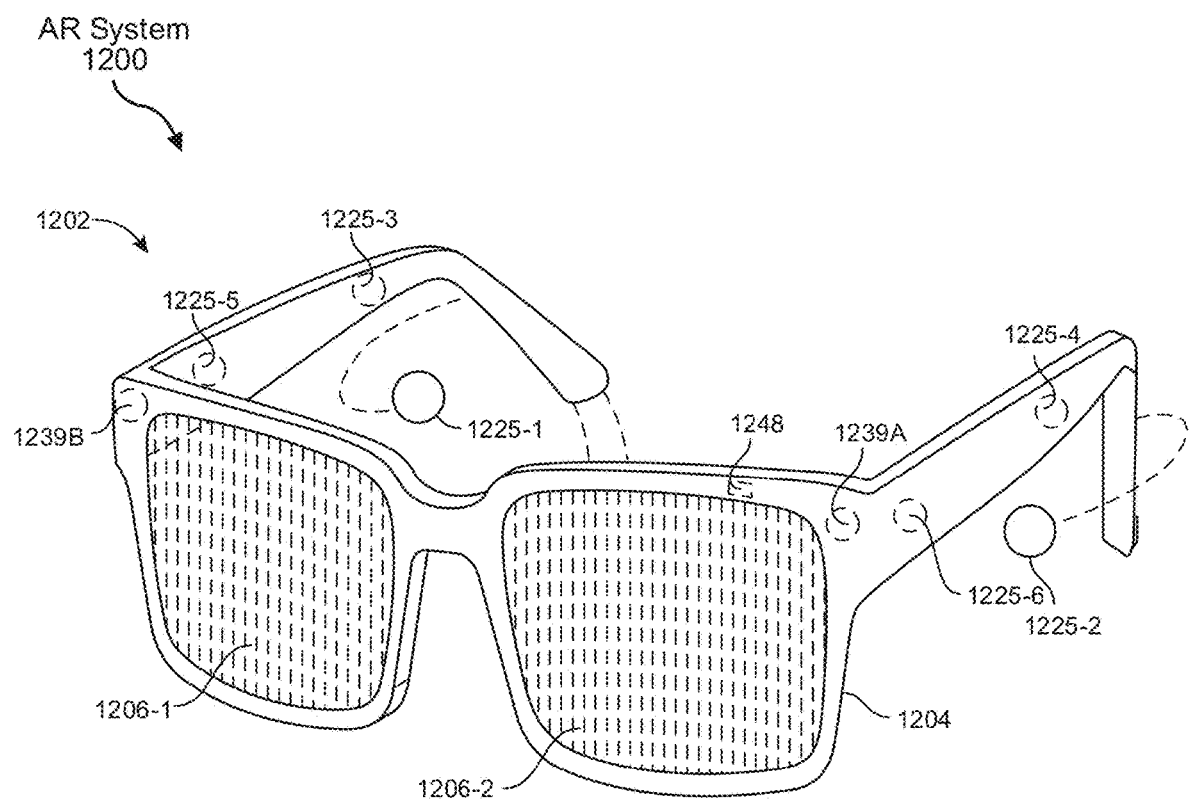
FIG. 12 is an illustration of an example augmented-reality system according to some embodiments of this disclosure.
Figure 13A:
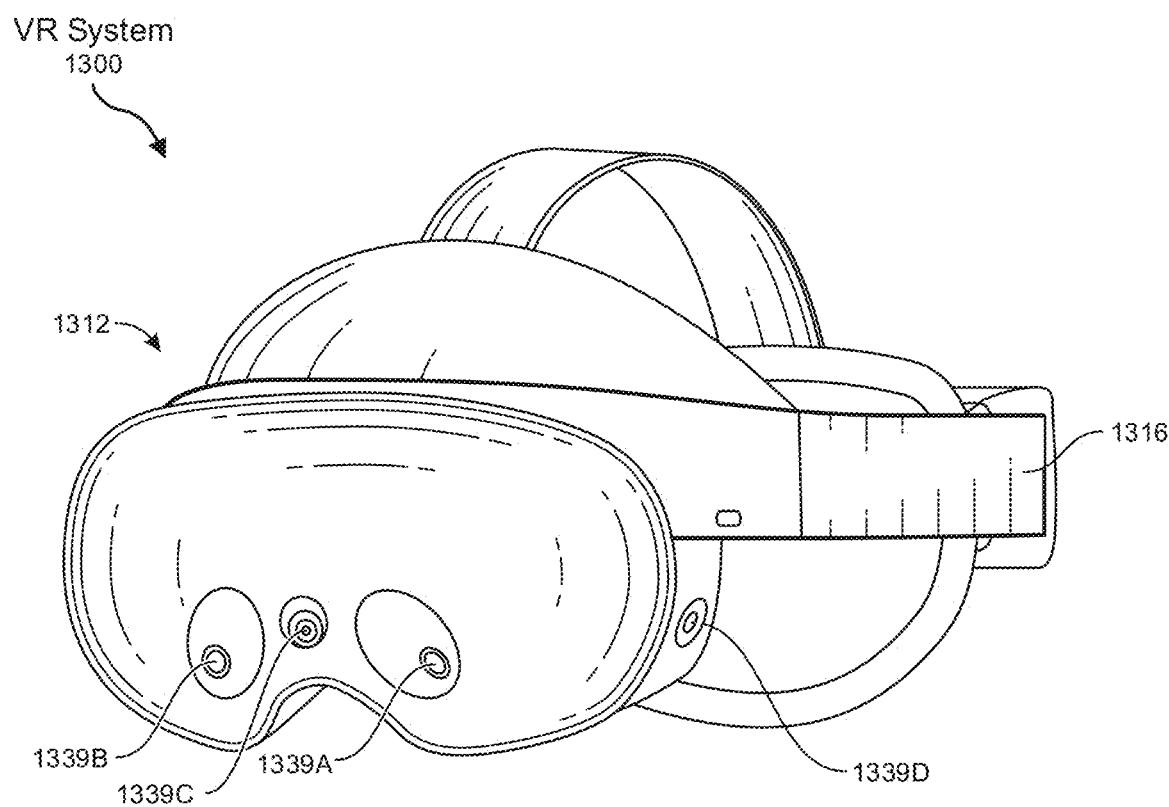
FIG. 13A is an illustration of an example virtual-reality system according to some embodiments of this disclosure.
Figure 13B:
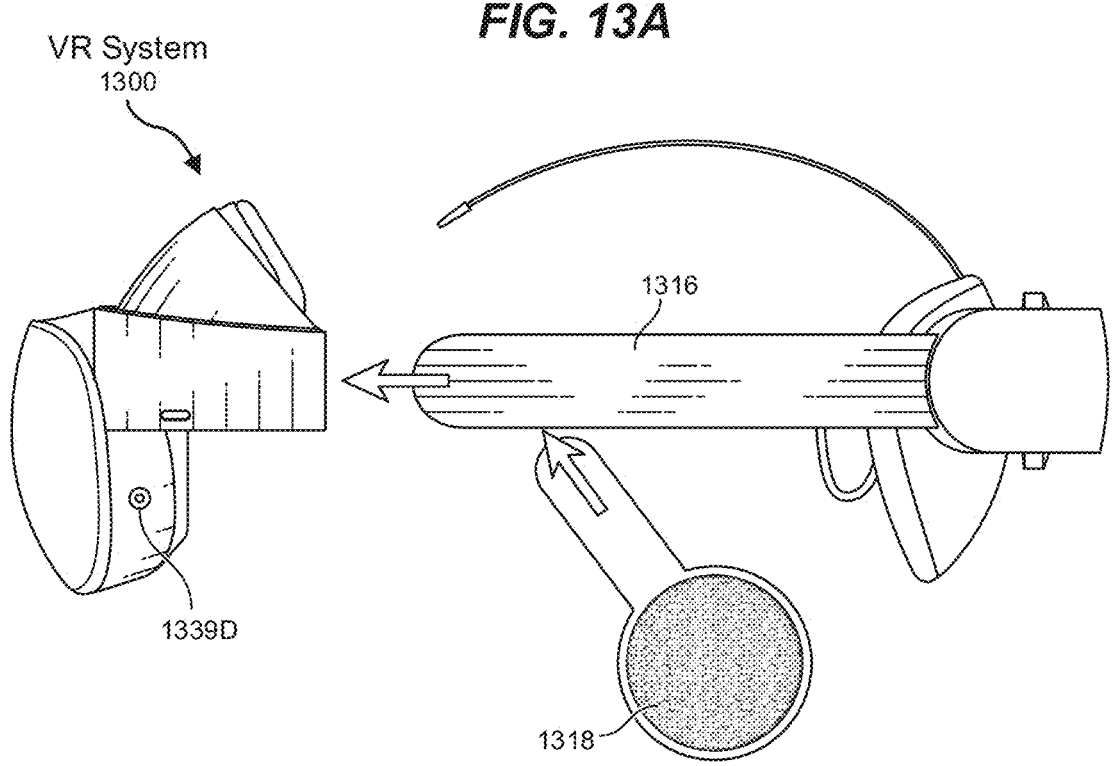
FIG. 13B is an illustration of another perspective of the virtual-reality system shown in FIG. 13A.
Figure 14:
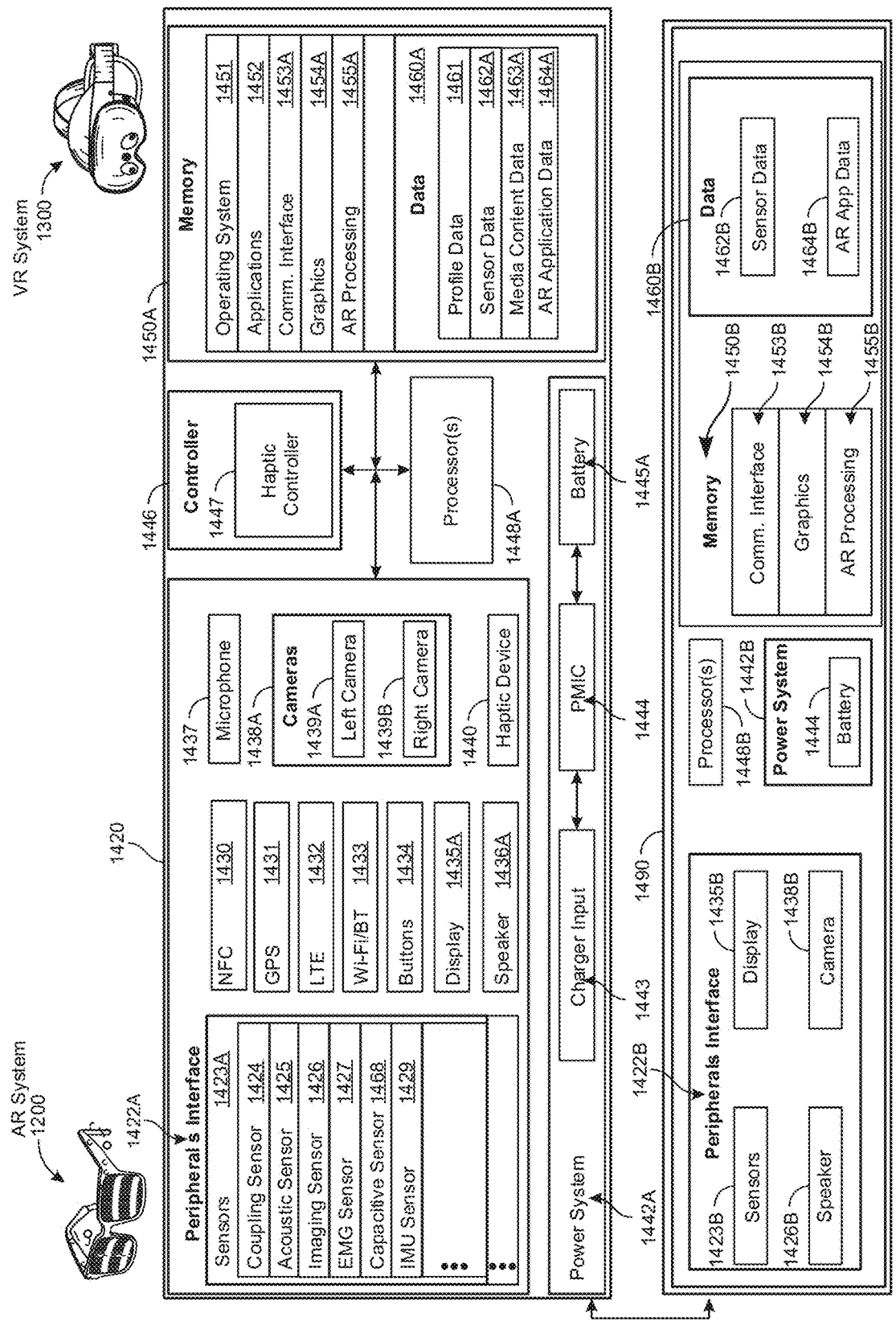
FIG. 14 is a block diagram showing system components of example artificial- and virtual-reality systems.

FIGS. 12 to 14 show example artificial-reality systems, which can be used as or in connection with wrist-wearable device 1000. In some embodiments, AR system 1200 includes an eyewear device 1202, as shown in FIG. 12. In some embodiments, VR system 1300 includes a head-mounted display (HMD) 1312, as shown in FIGS. 13A and 13B. In some embodiments, AR system 1200 and VR system 1300 can include one or more analogous components (e.g., components for presenting interactive artificial-reality environments, such as processors, memory, and/or presentation devices, including one or more displays and/or one or more waveguides), some of which are described in more detail with respect to FIG. 14. As described herein, a head-wearable device can include components of eyewear device 1202 and/or head-mounted display 1312. Some embodiments of head-wearable devices do not include any displays, including any of the displays described with respect to AR system 1200 and/or VR system 1300. While the example artificial-reality systems are respectively described herein as AR system 1200 and VR system 1300, either or both of the example AR systems described herein can be configured to present fully-immersive virtual-reality scenes presented in substantially all of a user's field of view or subtler augmented-reality scenes that are presented within a portion, less than all, of the user's field of view.

FIG. 12 show an example visual depiction of AR system 1200, including an eyewear device 1202 (which may also be described herein as augmented-reality glasses, and/or smart glasses). AR system 1200 can include additional electronic components that are not shown in FIG. 12, such as a wearable accessory device and/or an intermediary processing device, in electronic communication or otherwise configured to be used in conjunction with the eyewear device 1202. In some embodiments, the wearable accessory device and/or the intermediary processing device may be configured to couple with eyewear device 1202 via a coupling mechanism in electronic communication with a coupling sensor 1424 (FIG. 14), where coupling sensor 1424 can detect when an electronic device becomes physically or electronically coupled with eyewear device 1202. In some embodiments, eyewear device 1202 can be configured to couple to a housing 1490 (FIG. 14), which may include one or more additional coupling mechanisms configured to couple with additional accessory devices. The components shown in FIG. 12 can be implemented in hardware, software, firmware, or a combination thereof, including one or more signal-processing components and/or application-specific integrated circuits (ASICs).

Eyewear device 1202 includes mechanical glasses components, including a frame 1204 configured to hold one or more lenses (e.g., one or both lenses 1206-1 and 1206-2). One of ordinary skill in the art will appreciate that eyewear device 1202 can include additional mechanical components, such as hinges configured to allow portions of frame 1204 of eyewear device 1202 to be folded and unfolded, a bridge configured to span the gap between lenses 1206-1 and 1206-2 and rest on the user's nose, nose pads configured to rest on the bridge of the nose and provide support for eyewear device 1202, earpieces configured to rest on the user's ears and provide additional support for eyewear device 1202, temple arms configured to extend from the hinges to the earpieces of eyewear device 1202, and the like. One of ordinary skill in the art will further appreciate that some examples of AR system 1200 can include none of the mechanical components described herein. For example, smart contact lenses configured to present artificial reality to users may not include any components of eyewear device 1202.

Eyewear device 1202 includes electronic components, many of which will be described in more detail herein. Some example electronic components are illustrated in FIG. 12, including acoustic sensors 1225-1, 1225-2, 1225-3, 1225-4, 1225-5, and 1225-6, which can be distributed along a substantial portion of the frame 1204 of eyewear device 1202. Eyewear device 1202 also includes a left camera 1239A and a right camera 1239B, which are located on different sides of the frame 1204. Eyewear device 1202 also includes a processor 1248 (or any other suitable type or form of integrated circuit) that is embedded into a portion of the frame 1204.

FIGS. 13A and 13B show a VR system 1300 that includes a head-mounted display (HMD) 1312 (e.g., also referred to herein as an artificial-reality headset, a head-wearable device, a VR headset, etc.), in accordance with some embodiments. As noted, some artificial-reality systems (e.g., AR system 1200) may, instead of blending an artificial reality with actual reality, substantially replace one or more of a user's visual and/or other sensory perceptions of the real world with a virtual experience (e.g., AR systems 800 and 900).

HMD 1312 includes a front body 1314 and a frame 1316 (e.g., a strap or band) shaped to fit around a user's head. In some embodiments, front body 1314 and/or frame 1316 include one or more electronic elements for facilitating presentation of and/or interactions with an AR and/or VR system (e.g., displays, IMUs, tracking emitter or detectors). In some embodiments, HMD 1312 includes output audio transducers (e.g., an audio transducer 1318), as shown in FIG. 13B. In some embodiments, one or more components, such as the output audio transducer(s) 1318 and frame 1316, can be configured to attach and detach (e.g., are detachably attachable) to HMD 1312 (e.g., a portion or all of frame 1316, and/or audio transducer 1318), as shown in FIG. 13B. In some embodiments, coupling a detachable component to HMD 1312 causes the detachable component to come into electronic communication with HMD 1312.

FIGS. 13A and 13B also show that VR system 1300 includes one or more cameras, such as left camera 1339A and right camera 1339B, which can be analogous to left and right cameras 1239A and 1239B on frame 1204 of eyewear device 1202. In some embodiments, VR system 1300 includes one or more additional cameras (e.g., cameras 1339C and 1339D), which can be configured to augment image data obtained by left and right cameras 1339A and 1339B by providing more information. For example, camera 1339C can be used to supply color information that is not discerned by cameras 1339A and 1339B. In some embodiments, one or more of cameras 1339A to 1339D can include an optional IR cut filter configured to remove IR light from being received at the respective camera sensors.

FIG. 14 illustrates a computing system 1420 and an optional housing 1490, each of which show components that can be included in AR system 1200 and/or VR system 1300. In some embodiments, more or fewer components can be included in optional housing 1490 depending on practical restraints of the respective AR system being described.

In some embodiments, computing system 1420 can include one or more peripherals interfaces 1422A and/or optional housing 1490 can include one or more peripherals interfaces 1422B. Each of computing system 1420 and optional housing 1490 can also include one or more power systems 1442A and 1442B, one or more controllers 1446 (including one or more haptic controllers 1447), one or more processors 1448A and 1448B (as defined above, including any of the examples provided), and memory 1450A and 1450B, which can all be in electronic communication with each other. For example, the one or more processors 1448A and 1448B can be configured to execute instructions stored in memory 1450A and 1450B, which can cause a controller of one or more of controllers 1446 to cause operations to be performed at one or more peripheral devices connected to peripherals interface 1422A and/or 1422B. In some embodiments, each operation described can be powered by electrical power provided by power system 1442A and/or 1442B.

In some embodiments, peripherals interface 1422A can include one or more devices configured to be part of computing system 1420, some of which have been defined above and/or described with respect to the wrist-wearable devices shown in FIGS. 10 and 11. For example, peripherals interface 1422A can include one or more sensors 1423A. Some example sensors 1423A include one or more coupling sensors 1424, one or more acoustic sensors 1425, one or more imaging sensors 1426, one or more EMG sensors 1427, one or more capacitive sensors 1428, one or more IMU sensors 1429, and/or any other types of sensors explained above or described with respect to any other embodiments discussed herein.

In some embodiments, peripherals interfaces 1422A and 1422B can include one or more additional peripheral devices, including one or more NFC devices 1430, one or more GPS devices 1431, one or more LTE devices 1432, one or more Wi-Fi and/or Bluetooth devices 1433, one or more buttons 1434 (e.g., including buttons that are slidable or otherwise adjustable), one or more displays 1435A and 1435B, one or more speakers 1436A and 1436B, one or more microphones 1437, one or more cameras 1438A and 1438B (e.g., including the left camera 1439A and/or a right camera 1439B), one or more haptic devices 1440, and/or any other types of peripheral devices defined above or described with respect to any other embodiments discussed herein.

AR systems can include a variety of types of visual feedback mechanisms (e.g., presentation devices). For example, display devices in AR system 1200 and/or VR system 1300 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with a user's vision. Some embodiments of AR systems also include optical subsystems having one or more lenses (e.g., conventional concave or convex lenses, Fresnel lenses, or adjustable liquid lenses) through which a user can view a display screen.

For example, respective displays 1435A and 1435B can be coupled to each of the lenses 1206-1 and 1206-2 of AR system 1200. Displays 1435A and 1435B may be coupled to each of lenses 1206-1 and 1206-2, which can act together or independently to present an image or series of images to a user. In some embodiments, AR system 1200 includes a single display 1435A or 1435B (e.g., a near-eye display) or more than two displays 1435A and 1435B. In some embodiments, a first set of one or more displays 1435A and 1435B can be used to present an augmented-reality environment, and a second set of one or more display devices 1435A and 1435B can be used to present a virtual-reality environment. In some embodiments, one or more waveguides are used in conjunction with presenting artificial-reality content to the user of AR system 1200 (e.g., as a means of delivering light from one or more displays 1435A and 1435B to the user's eyes). In some embodiments, one or more waveguides are fully or partially integrated into the eyewear device 1202. Additionally, or alternatively to display screens, some artificial-reality systems include one or more projection systems. For example, display devices in AR system 1200 and/or VR system 1300 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s) 1435A and 1435B.

Computing system 1420 and/or optional housing 1490 of AR system 1200 or VR system 1300 can include some or all of the components of a power system 1442A and 1442B. Power systems 1442A and 1442B can include one or more charger inputs 1443, one or more PMICs 1444, and/or one or more batteries 1445A and 1444B.

Memory 1450A and 1450B may include instructions and data, some or all of which may be stored as non-transitory computer-readable storage media within the memories 1450A and 1450B. For example, memory 1450A and 1450B can include one or more operating systems 1451, one or more applications 1452, one or more communication interface applications 1453A and 1453B, one or more graphics applications 1454A and 1454B, one or more AR processing applications 1455A and 1455B, and/or any other types of data defined above or described with respect to any other embodiments discussed herein.

Memory 1450A and 1450B also include data 1460A and 1460B, which can be used in conjunction with one or more of the applications discussed above. Data 1460A and 1460B can include profile data 1461, sensor data 1462A and 1462B, media content data 1463A, AR application data 1464A and 1464B, and/or any other types of data defined above or described with respect to any other embodiments discussed herein.

In some embodiments, controller 1446 of eyewear device 1202 may process information generated by sensors 1423A and/or 1423B on eyewear device 1202 and/or another electronic device within AR system 1200. For example, controller 1446 can process information from acoustic sensors 1225-1 and 1225-2. For each detected sound, controller 1446 can perform a direction of arrival (DOA) estimation to estimate a direction from which the detected sound arrived at eyewear device 1202 of AR system 1200. As one or more of acoustic sensors 1425 (e.g., the acoustic sensors 1225-1, 1225-2) detects sounds, controller 1446 can populate an audio data set with the information (e.g., represented as sensor data 1462A and 1462B).

In some embodiments, a physical electronic connector can convey information between eyewear device 1202 and another electronic device and/or between one or more processors 1248, 1448A, 1448B of AR system 1200 or VR system 1300 and controller 1446. The information can be in the form of optical data, electrical data, wireless data, or any other transmittable data form. Moving the processing of information generated by eyewear device 1202 to an intermediary processing device can reduce weight and heat in the eyewear device, making it more comfortable and safer for a user. In some embodiments, an optional wearable accessory device (e.g., an electronic neckband) is coupled to eyewear device 1202 via one or more connectors. The connectors can be wired or wireless connectors and can include electrical and/or non-electrical (e.g., structural) components. In some embodiments, eyewear device 1202 and the wearable accessory device can operate independently without any wired or wireless connection between them.

In some situations, pairing external devices, such as an intermediary processing device (e.g., HIPD 606, 706, 806) with eyewear device 1202 (e.g., as part of AR system 1200) enables eyewear device 1202 to achieve a similar form factor of a pair of glasses while still providing sufficient battery and computation power for expanded capabilities. Some, or all, of the battery power, computational resources, and/or additional features of AR system 1200 can be provided by a paired device or shared between a paired device and eyewear device 1202, thus reducing the weight, heat profile, and form factor of eyewear device 1202 overall while allowing eyewear device 1202 to retain its desired functionality. For example, the wearable accessory device can allow components that would otherwise be included on eyewear device 1202 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on eyewear device 1202 standing alone. Because weight carried in the wearable accessory device can be less invasive to a user than weight carried in the eyewear device 1202, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, AR system 1200 and/or VR system 1300 can include one or more optical sensors such as two-dimensional (2D) or three-dimensional (3D) cameras, time-of-flight depth sensors, structured light transmitters and detectors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 13A and 13B show VR system 1300 having cameras 1339A to 1339D, which can be used to provide depth information for creating a voxel field and a two-dimensional mesh to provide object information to the user to avoid collisions.

In some embodiments, AR system 1200 and/or VR system 1300 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

In some embodiments of an artificial reality system, such as AR system 1200 and/or VR system 1300, ambient light (e.g., a live feed of the surrounding environment that a user would normally see) can be passed through a display element of a respective head-wearable device presenting aspects of the AR system. In some embodiments, ambient light can be passed through a portion less that is less than all of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable device, and an amount of ambient light (e.g., 15-50% of the ambient light) can be passed through the user interface element such that the user can distinguish at least a portion of the physical environment over which the user interface element is being displayed.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a lens that comprises or includes polycarbonate include embodiments where a lens consists essentially of polycarbonate and embodiments where a lens consists of polycarbonate.

What is claimed is:

1. A liquid crystal formulation comprising:
   a liquid crystal component;
      wherein the liquid crystal component comprises a ferroelectric material in an amount ranging from greater than 0 wt. % up to 10 wt. %;
   a chiral dopant;
   a stabilizing polymer; and
   a photo-initiator.

2. The liquid crystal formulation of claim 1, wherein the liquid crystal component is selected from the group consisting of a polymer-stabilized liquid crystal (PSLC), a polymer network liquid crystal (PNLC), and a polymer dispersed liquid crystal (PDLC).

3. The liquid crystal formulation of claim 1, wherein the liquid crystal component comprises a non-ferroelectric material and the ferroelectric material.

4. The liquid crystal formulation of claim 1, wherein a dielectric constant of the liquid crystal component is at least 30 at 1 KHz.

5. The liquid crystal formulation of claim 1, wherein a dielectric constant anisotropy (Δε) of the liquid crystal component is at least 10.

6. The liquid crystal formulation of claim 1, wherein a birefringence (Δn) of the liquid crystal component is at least 0.2.

7. The liquid crystal formulation of claim 1, wherein the stabilizing polymer comprises a diacrylate mesogen.

8. The liquid crystal formulation of claim 1, wherein the stabilizing polymer comprises a mono-functional polymer component and a bifunctional polymer component.

9. The liquid crystal formulation of claim 1, wherein a refractive index of the liquid crystal component and a refractive index of the stabilizing polymer differ by less than approximately 10%.

10. The liquid crystal formulation of claim 1, wherein the photo-initiator comprises a Type I photo-initiator.

11. The liquid crystal formulation of claim 1, comprising, by weight:
    at least 85% of the liquid crystal component;
    0.1 to 2% of the chiral dopant;
    2 to 10% of the stabilizing polymer; and
    0.1 to 2% of the photo-initiator.

12. The liquid crystal formulation of claim 1, comprising, by weight:
    90 to 95% of the liquid crystal component;
    0.1 to 2% of the chiral dopant;
    2 to 7% of the stabilizing polymer; and
    0.1 to 2% of the photo-initiator.

13. The liquid crystal formulation of claim 12, wherein the liquid crystal component comprises:
    approximately 90 to 99 wt. % of a non-ferroelectric material; and
    approximately 1 to 10 wt. % of the ferroelectric material.

14. A liquid crystal formulation comprising:
    a liquid crystal component;
       wherein the liquid crystal component comprises a ferroelectric material in an amount ranging from greater than 0 wt. % up to 10 wt. %;
    a chiral dopant;
    a stabilizing polymer; and a photo-initiator, wherein the liquid crystal component has a dielectric constant of at least 30 at 1 KHz, a dielectric anisotropy (Δε) of at least 10, and a birefringence (Δn) of at least 0.2.

15. The liquid crystal formulation of claim 14, wherein a refractive index of the liquid crystal component and a refractive index of the stabilizing polymer differ by less than approximately 10%.

16. A method comprising:
   forming a primary electrode;
   forming a layer of a liquid crystal formulation over the primary electrode; and
   forming a secondary electrode over the layer of the liquid crystal formulation, wherein the liquid crystal formulation comprises:
     a liquid crystal component;
       wherein the liquid crystal component comprises a ferroelectric material in an amount ranging from greater than 0 wt. % up to 10 wt. %;
     a chiral dopant;
     a stabilizing polymer; and
     a photo-initiator.

17. The method of claim 16, comprising:
   applying a first voltage of less than approximately 1 V between the primary electrode and the secondary electrode across a first region of the layer of the liquid crystal formulation; and
   applying a second voltage of greater than approximately 4 V between the primary electrode and the secondary electrode across a second region of the layer of the liquid crystal formulation, wherein:
     a transmittance of visible light through the first region of the layer of the liquid crystal formulation is greater than approximately 85%, and
     a transmittance of visible light through the second region of the layer of the liquid crystal formulation is less than approximately 10%.

18. The method of claim 17, wherein the first region of the layer of the liquid crystal formulation has less than approximately 5% bulk haze.

19. The liquid crystal formulation of claim 1, wherein the liquid crystal component comprises a nematic phase.

20. The liquid crystal formulation of claim 14, wherein the liquid crystal component comprises a nematic phase.

* * * * *